United States Patent
Cooper et al.

(10) Patent No.: US 11,642,738 B2
(45) Date of Patent: *May 9, 2023

(54) METHOD AND END ASSEMBLY FOR WELDING DEVICE

(71) Applicant: ELCo Enterprises, Inc., Jackson, MI (US)

(72) Inventors: Edward L Cooper, Clarklake, MI (US); Steven J Hayes, Addison, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,415

(22) Filed: Dec. 20, 2021

(65) Prior Publication Data

US 2022/0111463 A1    Apr. 14, 2022

Related U.S. Application Data

(63) Continuation of application No. 14/667,234, filed on Mar. 24, 2015, now Pat. No. 11,203,079, which is a continuation-in-part of application No. 14/224,942, filed on Mar. 25, 2014, now Pat. No. 9,950,386.

(51) Int. Cl.
*B23K 9/29* (2006.01)
*B23K 9/173* (2006.01)

(52) U.S. Cl.
CPC ............ *B23K 9/295* (2013.01); *B23K 9/173* (2013.01)

(58) Field of Classification Search
CPC .......... B23K 9/173; B23K 9/295; B23K 9/16; B23K 9/164

USPC ..................................... 219/137.42
See application file for complete search history.

(56) References Cited

U.S. PATENT DOCUMENTS

| | | |
|---|---|---|
| 3,676,640 A | 7/1972 | Bernard et al. |
| 4,529,863 A | 7/1985 | Lebel |
| 4,916,270 A | 4/1990 | West et al. |
| 5,097,108 A | 3/1992 | Hamal |
| 5,726,420 A | 3/1998 | Lajoie |
| 5,760,373 A | 6/1998 | Colling |
| 5,844,201 A | 12/1998 | Dibacco et al. |
| 6,075,227 A | 6/2000 | Lajoie |
| 6,225,599 B1 | 5/2001 | Altekruse |
| 6,307,179 B1 | 10/2001 | Walters |
| 6,444,950 B1 | 9/2002 | Altekruse et al. |

(Continued)

FOREIGN PATENT DOCUMENTS

| | | |
|---|---|---|
| EP | 1388388 A1 | 2/2004 |
| JP | S59178183 A | 10/1984 |

(Continued)

*Primary Examiner* — Sang Y Paik
(74) *Attorney, Agent, or Firm* — Dickinson Wright PLLC

(57) ABSTRACT

An end assembly for use with a welding device having a chamber between the diffuser sleeve and the insert which allows for cooling the insert and for controlling the flow of gas through the end assembly. Some of the components of the end assembly such as the contact tip, insert and gooseneck are constructed of a conductive material which are securely held together in contact by a diffuser sleeve constructed of a dissimilar material. The end assembly provides better conductivity of the current through the end assembly for use of less energy during welding.

30 Claims, 11 Drawing Sheets

(56) References Cited

U.S. PATENT DOCUMENTS

| | | |
|---|---|---|
| 6,525,297 B2 | 2/2003 | Doherty |
| 6,720,528 B1 | 4/2004 | Matiash et al. |
| 6,744,013 B2 | 6/2004 | Jones |
| 6,847,009 B2 | 1/2005 | Stuart et al. |
| 6,924,461 B2 | 8/2005 | Matiash |
| 7,105,775 B2 | 9/2006 | Giese |
| 7,176,412 B2 | 2/2007 | Wells |
| 7,381,923 B2 | 6/2008 | Gordon et al. |
| 7,576,300 B2 | 8/2009 | Giese |
| 7,663,074 B2 | 2/2010 | Wells |
| 8,304,693 B2 | 11/2012 | Ma |
| 8,450,646 B2 | 5/2013 | Ma et al. |
| 8,633,422 B2 | 1/2014 | Giese |
| 9,138,824 B2 | 9/2015 | Giese |
| 9,364,915 B2 | 6/2016 | Meess et al. |
| 11,203,079 B2 * | 12/2021 | Cooper .................. B23K 9/173 |
| 2005/0218132 A1 | 10/2005 | Wells |
| 2006/0289413 A1 | 12/2006 | Eberle |
| 2007/0228729 A1 | 10/2007 | Grimmett et al. |
| 2007/0246445 A1 | 10/2007 | Kachline |
| 2008/0061050 A1 | 3/2008 | Walters |
| 2008/0105668 A1 | 5/2008 | Giese |
| 2008/0314876 A1 | 12/2008 | Pinsonneault et al. |
| 2009/0045183 A1 | 2/2009 | Artelsmair et al. |
| 2009/0071942 A1 | 3/2009 | Kachline et al. |
| 2009/0107958 A1 | 4/2009 | Khakhalev |
| 2011/0062130 A1 | 3/2011 | Barket et al. |
| 2014/0021183 A1 | 1/2014 | Peters |
| 2015/0190879 A1 | 7/2015 | Kachline |
| 2015/0360314 A1 | 12/2015 | Kachline |
| 2016/0039036 A1 | 2/2016 | Meess et al. |
| 2016/0039037 A1 | 2/2016 | Meess et al. |

FOREIGN PATENT DOCUMENTS

| | | |
|---|---|---|
| JP | H01309787 A | 12/1989 |
| KR | 101341872 B1 | 12/2013 |

* cited by examiner

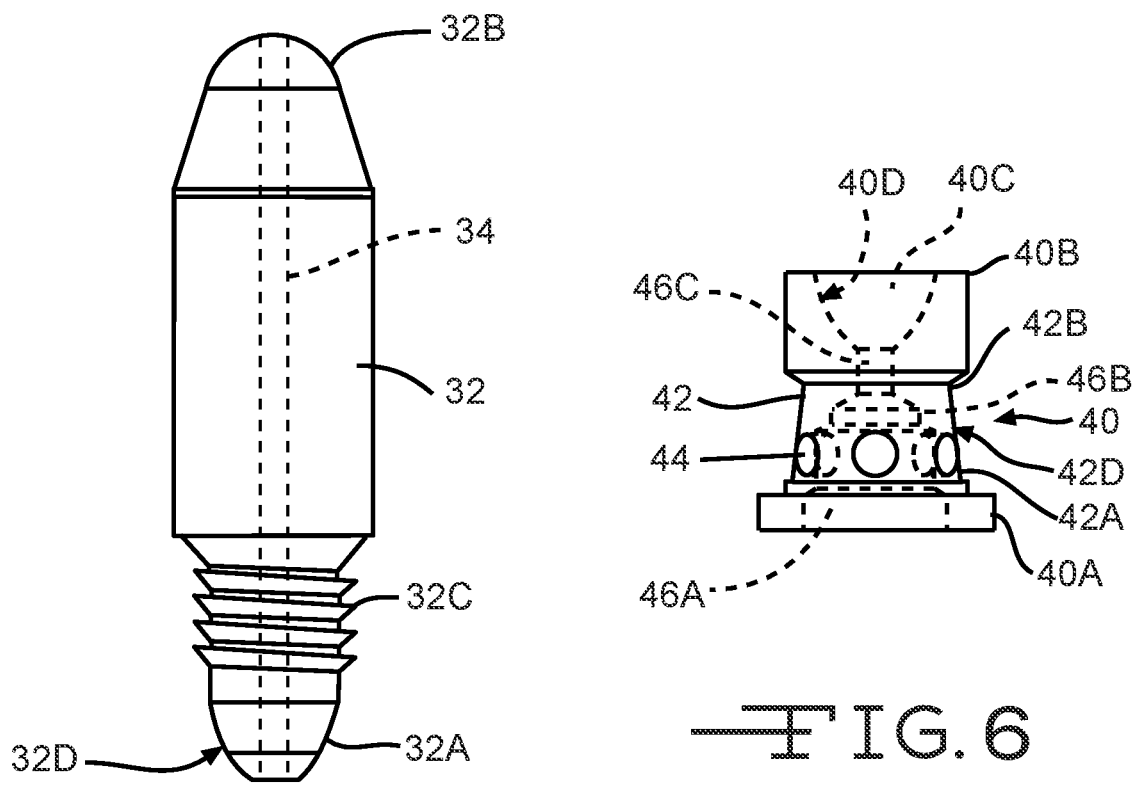
FIG. 5
FIG. 6
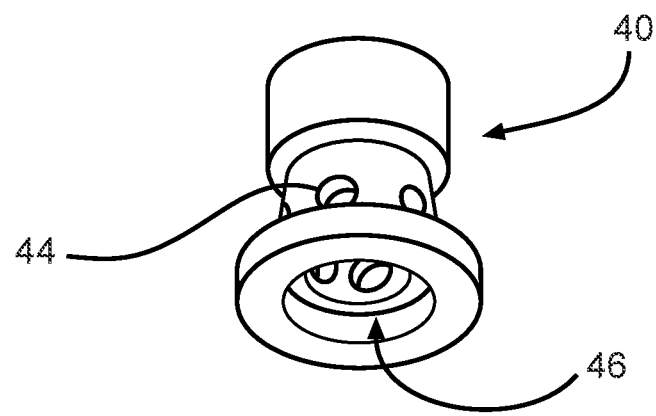
FIG. 7

METHOD AND END ASSEMBLY FOR WELDING DEVICE

CROSS-REFERENCE TO RELATED APPLICATIONS

This application is a continuation of U.S. application Ser. No. 14/667,234 filed on Mar. 24, 2015, which is a continuation-in-part of U.S. application Ser. No. 14/224,942 filed on Mar. 25, 2014, now U.S. Pat. No. 9,950,386, which are hereby incorporated herein by reference in their entirety, except that the present application supersedes any portion of the above referenced application which is inconsistent with the present application.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

BACKGROUND OF THE INVENTION (1) Field of the Invention

The present invention relates to an end assembly for use in a welding device. In particular, the present invention relates to end assembly having an insert for controlling the flow of gas during welding. Further the present invention relates to a method for controlling the flow of gas to cool the welding device.

Metal Inert Gas (MIG) welding also referred to as "wire-feed" or Gas Metal Arc Welding (GMAW) utilizes heat from an electrical arc to melt a consumable electrode to form a weld on a workpiece. A MIG welding system typically includes a power supply, a gas supply and an electrode supply connected to a welding device or welding gun. A ground cable is used to connect the workpiece to the power supply. The welding device generally includes a handle, a gooseneck and an end assembly. The welding system can be automatic or semi-automatic and may be manually or robotically controlled. The electrode and gas are coupled through a conduit in the handle and the gooseneck to the end assembly of the welding device. The electrode extends through the contact tip of the end assembly and the gas moves around the contact tip in the nozzle of the end assembly. When the welding device is activated, the electrode is fed through the contact tip toward the workpiece and the gas is directed through the nozzle towards the workpiece. When the electrode is placed adjacent or in contact with the workpiece, the electrode completes an electrical circuit between the power supply and the workpiece allowing current to flow through the electrode to the workpiece. The current produces an arc between the electrode and the workpiece. The heat of the arc melts the electrode and the workpiece in the region surrounding the arc creating a weld puddle. The gas flowing out the nozzle shields the weld puddle from outside contaminants. The type of gas used in MIG welding varies depending on many factors. Noble or inert gases such as Argon are often used. However, Carbon Dioxide ($CO_2$) and a mixture of gases such as $CO_2$ and Argon are also used. Once the electrode is moved away from the workpiece, the electric circuit is broken and the weld puddle cools and solidifies forming a weld.

There remains a need for an end assembly for a welding device which allows for better control of the flow of gas around the weld puddle and which reduces the energy used during welding by providing consistent current flow.

BRIEF SUMMARY OF THE INVENTION

The end assembly of the present invention is used with a welding device for GMAW. In one embodiment, the end assembly includes a gooseneck, a diffuser sleeve, an insert, a contact tip and a nozzle. The components of the end assembly are secured together so as to share a common axis. The insert has an inner passageway and a wall extending between the ends. The wall has at least one hole in fluid communication with the inner passageway. The diffuser sleeve has an inner cavity and a wall extending between the ends. The wall has at least one hole in fluid communication with the inner cavity. The insert is positioned in the inner cavity of the diffuser sleeve spaced between the gooseneck and the contact tip. The wall of the insert and the wall of the diffuser sleeve are axially adjacent along the longitudinal axis of the end assembly and are spaced apart in a direction essentially perpendicular to the longitudinal axis of the end assembly so that a chamber is formed between the wall of the insert and the wall of the diffuser sleeve. The hole in the wall of the diffuser sleeve and the hole in the wall of the insert are in fluid communication with the chamber.

In a second embodiment, the end assembly includes a gooseneck, a diffuser, a diffuser sleeve, a contact tip, and a nozzle. In this embodiment, the diffuser is secured on the second end of the gooseneck. The components of the end assembly are secured together so as to share a common axis. The diffuser has an inner passageway and a wall extending between the ends. The wall has at least one hole in fluid communication with the inner passageway. The diffuser sleeve has an inner cavity and a wall spaced between the ends. The wall of the diffuser sleeve has at least on hole in fluid communication with the inner cavity. The diffuser is positioned in the inner cavity of the diffuser sleeve so that the wall of the diffuser and the wall of the diffuser sleeve are positioned essentially axially adjacent along the longitudinal axis of the end assembly. The wall of the diffuser and the wall the diffuser sleeve are spaced apart in a direction essentially perpendicular to the longitudinal axis of the end assembly so that a chamber is formed between the wall of the diffuser and the wall of the diffuser sleeve. The hole in the wall of the diffuser sleeve and the hole in the wall of the diffuser are in fluid communication with the chamber.

The chamber can have a variety of shapes and sizes. In one embodiment, a size of the chamber varies along the axial length of the chamber between the ends of the chamber. In one embodiment, a length of the chamber between the ends varies. In one embodiment, the chamber is tapered along the axial length of the chamber so that a size or diameter of the chamber adjacent the first end of the diffuser sleeve is less than a size or diameter of the chamber adjacent the second end of the diffuser sleeve. In one embodiment, the hole or holes in the wall of the diffuser sleeve is axially misaligned along the longitudinal axis of the end assembly with the hole or holes in the wall of the insert or in the diffuser. In one embodiment, a diameter of the hole or holes in the walls of the insert or in the diffuser are not equal to a diameter of the hole or holes in the wall of the diffuser sleeve. In one embodiment, a diameter of the hole or holes in the walls of the insert or in the diffuser are equal to a diameter of the hole or holes in the wall of the diffuser sleeve.

In use, the gas flows from the gas supply through the passageway of the gooseneck into the inner passageway of the insert or diffuser. The gas flows to the diffuser section of the inner passageway and exits the inner passageway into the chamber through the hole or holes in the wall of the insert or in the diffuser. The gas is held or trapped in the chamber and moves in the chamber. In one embodiment, the velocity of the gas in the chamber is changed and controlled. In one embodiment, the chamber changes a velocity of the gas so that a velocity of the gas exiting the chamber is different from a velocity of the gas entering the chamber. In one embodiment, a velocity of the gas is changed by changing a diameter of the hole or holes in the wall of the insert or in the diffuser. In one embodiment, a velocity of the gas exiting the chamber is changed by changing a diameter of the hole or holes in the wall of the diffuser sleeve. In one embodiment, a velocity of the gas exiting the chamber is changed by changing a position of the hole or holes in the wall of the insert or in the wall of the diffuser. In one embodiment, a velocity of the gas exiting the chamber is changed by changing a position of the hole or holes in the wall of the diffuser sleeve. In one embodiment, a velocity of the gas in the chamber and exiting the chamber is changed by changing the number of holes in the wall of the insert or in the wall of the diffuser. In one embodiment, a velocity of the gas exiting the chamber is changed by changing the number of holes in the wall of the diffuser sleeve. In one embodiment, the movement of the gas in the chamber and exiting the chamber is controlled by changing the size of the chamber, or changing the position of the hole or holes in the wall of the insert or the diffuser, or changing the position of the hole or holes in the wall of the diffuser sleeve, or changing the number or diameter of the hole or holes in the wall of the insert or in the diffuser or changing the number or diameter of the hole or holes in the wall of the diffuser sleeve. The chamber allows for controlling the flow of gas through the end assembly. The gas exits the chamber though the hole or holes in the wall of the diffuser sleeve into the gas channel of the nozzle. The gas moves along the gas channel to the second end of the nozzle to the work piece. Controlling the flow of the gas reduces contaminants in the weld puddle allowing for a better weld. The shape of the gas channel of the nozzle and the shape of the contact tip can be adjusted to control the flow of gas around the weld puddle. Controlling the gas also reduces the amount of gas used during welding. The gas trapped in the chamber also acts to cool the insert or the diffuser. Cooling the insert or the diffuser also pulls heat away from the contact tip to reduce damage to the contact tip from heat during welding to extend the useful life of the contact tip. In one embodiment, the second end of the insert has an indention with an inner surface and the first end of the contact tip has a radiused end surface and the first end of the contact tip extends into the indention so that the radiused end surface of the contact tip is in contact with the inner surface of the indention to provide better contact between the insert and the contact tip for better heat transfer and for better current conductivity. In one embodiment the contact tip is threaded into the second end of the diffuser sleeve and the second end of the gooseneck is threaded into the first end of the diffuser sleeve and the insert is spaced between and in contact with the contact tip and the gooseneck and the diffuser sleeve securely holds the gooseneck, insert and contact tip in position and in secure constant contact.

In one embodiment, the second end of the gooseneck, the insert and the contact tip are constructed of a conductive material and the diffuser sleeve is constructed on a poorly conductive or non-conductive material or a material that is less conductive than the material or materials used to construct the insert or the contact tip. In one embodiment, of the second embodiment, the gooseneck, the diffuser and contact tip are constructed of a conductive material and the diffuser sleeve is constructed of a poorly conductive or non-conductive material or a material that is less conductive than the material or materials used to construct the insert or the contact tip. In one embodiment, of the third embodiment, the insert and the contact tip are constructed of a conductive material and the diffuser base and the diffuser sleeve are constructed of a poorly conductive or non-conductive material or a material that is less conductive than the material or materials used to construct the insert or the contact tip. The diffuser sleeve securely holds the second end of the gooseneck, the insert and the contact tip in tight, secure contact so that the components do not move during welding. In the second embodiment the diffuser sleeve securely holds the second end of the gooseneck, the diffuser and the contact tip in tight, secure contact so that the components do not move during welding. In the third embodiment, the diffuser sleeve holds the insert and the contact tip in tight, secure contact so that the components do not move during welding. The tight, secure contact between the conductive gooseneck, the insert and the contact tip or in the second embodiment, the gooseneck, the diffuser and the contact tip allows for a constant current flow through the end assembly with less resistance and less impedance. The constant current flow allows for consistent arc starts during welding and reduces the energy used during welding. In one embodiment, the insert and the contact tip are constructed of a material dissimilar to the material used to construct the diffuser sleeve. In the second embodiment, the diffuser and the contact tip are constructed of a material dissimilar to the material used to construct the diffuser sleeve. In the third embodiment, the insert and contact tip are constructed of a material dissimilar to the material used to construct the diffuser sleeve and the diffuser base. The use of dissimilar materials allows for a tighter connection between the contact tip and insert by reducing the temperature of the components during welding which prevents fusing of the contact tip and insert or the contact tip and diffuser with the diffuser sleeve during welding. In one embodiment, the second end of the gooseneck, the insert and the contact tip are constructed of copper and the diffuser sleeve is constructed of brass. In the second embodiment, the gooseneck, the diffuser and the contact tip are constructed of copper and the diffuser sleeve is constructed of brass. In the third embodiment, the insert and contact tip are constructed of copper and the diffuser sleeve and the diffuser base are constructed of brass.

The present invention relates to an end assembly for a welding device comprising, a gooseneck having a passageway, a diffuser sleeve having a first end and a second end with an longitudinal axis extending therebetween, having an inner cavity and having a wall having a hole, the diffuser sleeve connected to the gooseneck, an insert having an inner passageway and a wall having a hole, the insert positioned in the inner cavity of the diffuser sleeve with the wall of the insert axially adjacent and spaced apart from the wall of the diffuser sleeve forming a chamber positioned between the wall of the insert and the wall of the diffuser assembly so that the hole in the wall of the diffuser sleeve and the hole in the wall of the insert are in fluid communication with the chamber; a contact tip positioned in the inner cavity of the diffuser sleeve so that the contact tip extends into the inner cavity of the diffuser sleeve and extends outward from the diffuser sleeve in a direction opposite the insert; and a nozzle having a gas channel and connected to the diffuser sleeve, the nozzle extending outward from the diffuser sleeve in a direction opposite the gooseneck.

Further, the present invention relates to a diffuser assembly for use in a welding device comprising a diffuser sleeve having a first end and a second end with an longitudinal axis extending therebetween, having a wall with a hole and having an inner cavity; an insert having a wall with a hole and an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber.

Still further, the present invention relates to a an end assembly for a welding device comprising a gooseneck having a passageway; a diffuser adjacent the gooseneck, the diffuser having a wall with a hole and an inner passageway in fluid communication with the passageway of the gooseneck; a diffuser sleeve having a first end and a second end with an longitudinal axis extending therebetween, the diffuser sleeve having a wall with a hole and having an inner cavity, the diffuser sleeve connected at the first end to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve so that the hole in the wall of the diffuser sleeve and the hole in the wall of the diffuser are in fluid communication with the chamber; and a contact tip configured to extend into the inner cavity of the diffuser sleeve at the second end of the diffuser sleeve.

Further still, the present invention relates to a in a combination contact tip and diffuser assembly for a welding device, the combination comprising, the diffuser assembly having a diffuser sleeve having a first end and a second end with an longitudinal axis extending therebetween, having a wall with a hole and having an inner cavity, the diffuser assembly having an insert with a first end and a second end, the second end having an indention with a radiused inner surface, the insert having a wall with a hole and having an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber; and the contact tip having a first end and a second end with a center bore extending therethrough, the first end having a radiused outer surface, the contact tip inserted in the inner cavity of the diffuser sleeve at the second end of the diffuser sleeve so that the outer surface of the first end of the contact tip extends into the indention in the second end of the insert and the end surface of the contact tip abuts the inner surface of the insert and the center bore of the contact tip is aligned with the inner passageway of the insert.

Further still, the present invention relates in one embodiment, to a contact tip for a welding device comprising a radiused or rounded or convex curved first end and a radiused second end with a center bore extending there through and having buttress threads spaced apart from second end. In one embodiment, the second end of the diffuser sleeve has buttress threads with mate with the buttress threads of the contact tip. In one embodiment, the contact tip has four buttress threads.

Still further, the present invention relates to a method for controlling a flow of gas in a welding device comprising the steps of providing a gas supply; providing a welding gun having an end assembly, the end assembly having a gooseneck with a passageway, a diffuser sleeve connected to the gooseneck having a first end and a second end with an longitudinal axis extending therebetween, the diffuser sleeve having an inner cavity and having a wall with a hole, an insert positioned in the inner cavity of the diffuser sleeve and having an inner passageway and a wall having a hole, the wall of the insert axially adjacent and spaced apart from the wall of the diffuser sleeve forming a chamber positioned between the wall of the insert and the wall of the diffuser assembly so that the hole in the wall of the diffuser sleeve and the hole in the wall of the insert are in fluid communication with the chamber; a contact tip positioned in the inner cavity of the diffuser sleeve so that the contact tip extends into the inner cavity of the diffuser sleeve and extends outward from the diffuser sleeve in a direction opposite the insert; and a nozzle having a gas channel and connected to the diffuser sleeve, the nozzle extending outward from the diffuser sleeve in a direction opposite the gooseneck; supplying the gas to the passageway of the gooseneck so that the gas moves though passageway of gooseneck to the inner passageway of the insert though the hole in the wall of the insert and into the chamber; controlling the gas in the chamber; and controlling the gas exiting the chamber through the hole in the diffuser sleeve and through the gas channel of the nozzle.

Further still, the present invention relates to a method for controlling a flow of gas in a welding device comprising the steps of providing a gas supply; providing a welding gun having a gooseneck with a passageway, diffuser connected to the gooseneck, the diffuser having a wall with a hole and an inner passageway in fluid communication with the passageway, a diffuser sleeve having a first end and a second end with an longitudinal axis extending therebetween, having a wall with a hole and having an inner cavity, the diffuser sleeve connected to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve with the hole in the wall of the diffuser sleeve and the hole in the wall of the diffuser in fluid communication with the chamber, a contact tip configured to extend into the inner cavity of the diffuser sleeve; and a nozzle having a gas channel and configured to connect to the gooseneck and extend outward along the contact tip; supplying the gas to the passageway of the gooseneck so that the gas moves though passageway of gooseneck to the inner passageway of the diffuser though the hole in the wall of the diffuser into the chamber; controlling the gas in the chamber; and controlling the gas exiting the chamber through the hole in the diffuser sleeve and through the gas channel of the nozzle.

Still further, the present invention relates to a method for cooling a contact tip of a welding device which comprises the steps of providing a gas supply; providing an end assembly having a diffuser sleeve with a first end and a second end extending along a longitudinal axis, the diffuser sleeve having a wall with a hole and having an inner cavity; an insert having a wall with a hole and an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber; providing a contact tip in contact with an insert; moving gas from the gas supply into the end assembly and into the inner passageway of the insert and through the hole in the insert and into the chamber; temporarily trapping the gas in the chamber; controlling the gas in the chamber to cool the insert and the contact tip; and moving the gas out of the chamber through the hole in the diffuser sleeve.

Further still, the present invention relates to a method for cooling a contact tip of a welding device which comprises the steps of providing a gas supply; providing a gooseneck having a passageway, a diffuser connected to the diffuser, the diffuser having a wall with a hole and an inner passageway in fluid communication with the passageway, a diffuser sleeve having a first end and a second end with an longitudinal axis extending therebetween, having a wall with a hole and having an inner cavity, the diffuser sleeve connected to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve with the hole in the wall of the diffuser sleeve and the hole in the wall of the diffuser in fluid communication with the chamber; providing a contact tip in contact with the diffuser; moving gas from the gas supply into the passageway of the gooseneck and into the inner passageway of the diffuser and through the hole in the diffuser and into the chamber; temporarily trapping the gas in the chamber; moving the gas in the chamber to cool the diffuser and the contact tip; and moving the gas out of the chamber through the hole in the diffuser sleeve.

In one embodiment, the hole in the wall of the diffuser sleeve is axially misaligned with the hole in the wall of the insert. In one embodiment, a diameter of the hole in the wall of the diffuser sleeve is greater than a diameter of the hole in the wall of the insert. In one embodiment, a size of the chamber varies along the length. In one embodiment, the size of the chamber at the first end is less than the size of the chamber at the second end. In one embodiment, the outer surface of the wall of the insert is angled. In one embodiment, a diameter of the chamber varies along the length of the chamber. In one embodiment, the diameter of the chamber at the first end is greater than a diameter of the chamber at the second end. In one embodiment, the second end of the insert has an indention with a radiused inner surface and the contact tip has a first end with a radiused end surface and the first end of the contact tip extends into the indention in the second end of the insert so that the radiused end surface of the contact tip abuts the radiused inner surface of the insert. In one embodiment, the insert is constructed of a conductive material, the contact tip is constructed of a conductive material and the diffuser sleeve is constructed of a poorly conductive, less conductive or non-conductive material and the insert is in contact with the contact tip. In one embodiment, the end of the gooseneck is constructed of a conductive material and extends into the inner cavity of the diffuser sleeve and into contact with the insert. In one embodiment, the insert is constructed of copper, the contact tip is constructed of copper, the end of the gooseneck is constructed of copper and the diffuser sleeve is constructed of brass and the end of the gooseneck extends into the inner cavity of the diffuser sleeve and into contact with the insert and the insert is in contact with the contact tip. In one embodiment, the gooseneck has an inner conduit constructed of copper and the inner conduit is in contact with the insert. In one embodiment, the insert is constructed of copper, the contact tip is constructed on copper and the diffuser sleeve is constructed of brass and the insert is in contact with the contact tip. In one embodiment, the insert and the contact tip are constructed of a material dissimilar to the material used to construct the diffuser sleeve. In one embodiment, the gooseneck has an inner conduit constructed of copper and the inner conduit is in contact with the insert. In one embodiment, the insert is axially positioned in the inner cavity of the diffuser sleeve between the gooseneck and the contact tip. In one embodiment, the insert is axially secured and fixed in the inner cavity of the diffuser sleeve between the gooseneck and the contact tip. In one embodiment, the insert has a first end and a second end and the gooseneck contacts the first end of the insert and the contact tip contacts the second end of the insert. In one embodiment, the insert is constructed of copper, the contact tip is constructed of copper and the diffuser sleeve is constructed of brass and the insert is in contact with the contact tip. In one embodiment, the gooseneck has an inner conduit constructed of copper and the inner conduit is in contact with the insert. In one embodiment, the welding device has a gooseneck having an end constructed of a conductive material and a contact tip, the end of the gooseneck extends into the inner cavity of the diffuser sleeve at the first end of the diffuser sleeve and contacts the insert and wherein the contact tip extends into the inner cavity of the diffuser sleeve at the second end of the diffuser sleeve and contacts the insert. In one embodiment, the contact tip is constructed of a conductive material. In one embodiment, the insert is constructed of copper and the diffuser sleeve is constructed of brass. In one embodiment, the welding device has a gooseneck having an end constructed of copper and a contact tip, the end of the gooseneck extends into the inner cavity of the diffuser sleeve at the first end of the diffuser sleeve and contacts the insert and the contact tip extends into the inner cavity of the diffuser sleeve at the second end of the diffuser sleeve and contacts the insert. In one embodiment, the contact tip is constructed of copper. In one embodiment, the inner cavity of the diffuser sleeve has threads and the contact tip is threaded into the inner cavity of the diffuser sleeve at the second end of the diffuser sleeve. In one embodiment, the welding device has a contact tip having a first end with a radiused end surface, the insert has a first end and a second end, the second end having an indention with a radiused inner surface and the first end of the contact tip extends into the indention in the second end of the insert so that the radiused end surface of the contact tip abuts the radiused inner surface of the insert. In one embodiment, the hole in the wall of the diffuser sleeve is axially misaligned with the hole in the wall of the diffuser. In one embodiment, a diameter of the hole in the wall of the diffuser sleeve is greater than a diameter of the hole in the wall of the diffuser. In one embodiment, the chamber has opposed first and second ends with a length between ends and a size of the chamber varies along the length. In one embodiment, the first end of the chamber is adjacent the first end of the diffuser sleeve and the size of the chamber at the first end is less than the size of the chamber at the second end. In one embodiment, the wall of the diffuser has an outer surface and the outer surface of the wall is angled. In one embodiment, the chamber has opposed first and second ends extending along the axis of the diffuser sleeve with a length between ends and a diameter of the chamber varies along the length. In one embodiment, a diameter of the chamber at the first end is greater than a diameter of the chamber at the second end. In one embodiment, the first end of the chamber is adjacent the first end of the diffuser sleeve. In one embodiment, the diffuser is constructed of copper, the contact tip is constructed of copper and the diffuser sleeve is constructed of brass and the diffuser is in contact with the contact tip. In one embodiment, the diffuser and contact tip are constructed of a material dissimilar to the material used to construct the diffuser sleeve. In one embodiment, the gooseneck has an inner conduit constructed of copper and the diffuser is in contact with inner conduit. In one embodiment, the diffuser and the inner conduit are a single integral piece. In one embodiment, the gooseneck extends into the inner cavity of the diffuser sleeve at the first end of the diffuser sleeve and the inner cavity of the diffuser sleeve has threads and wherein the contact tip is threaded into the inner cavity of the diffuser sleeve at the second end of the diffuser sleeve. In one embodiment, the inner cavity of the diffuser sleeve at the second end is configured to receive buttress threads, the first end of the contact tip has buttress threads and the contact tip is threaded into the inner cavity of the diffuser sleeve. In one embodiment, the wall of the insert has an outer surface and wherein the outer surface of the wall is angled. In one embodiment, the chamber has opposed first and second ends extending along the axis of the diffuser sleeve with a length between ends and a diameter of the chamber varies along the length. In one embodiment, the insert is constructed of copper, the contact tip is constructed on copper and the diffuser sleeve is constructed of brass. In one embodiment, the welding device has a gooseneck having an end constructed of copper, the gooseneck extends into the inner cavity of the diffuser sleeve at the first end of the diffuser sleeve and the end of the gooseneck contacts the insert. In one embodiment, the contact tip has a first end and second end and the second end has a radiused outer surface, the nozzle has a first end and a second end, the first end of the contact tip is adjacent the first end of the nozzle and the gas moves in the gas channel from the first end to the second end of the nozzle and the radiused outer surface of the second end of the contact tip reduces a disturbance of the gas as the gas flows around the second end of the contact tip. In one embodiment, the velocity of the gas in the chamber is controlled. In one embodiment, the gas is controlled by selecting a position of the hole in the wall of the insert so that the hole in the wall of the insert is axially misaligned with the hole in the wall of the diffuser sleeve. In one embodiment, the gas is controlled by changing a size of the chamber. In one embodiment, the gas is controlled by selecting a position of the hole in the wall of the insert so that the hole in the wall of the insert is axially misaligned with the hole in the wall of the diffuser sleeve. In one embodiment, the gas is controlled by adjusting a size of the chamber. In one embodiment, the chamber has opposed first and second ends with a length between ends and the gas is controlled by tapering the chamber along the length of the chamber. In one embodiment, the chamber has opposed first and second ends having an axial length therebetween and the gas is controlled by varying a diameter of the chamber along the axial length of the chamber. In one embodiment, the first end of the chamber is adjacent the gooseneck and opposite the insert and the gas is controlled by tapering the chamber so that a diameter of the chamber at the first end is less than a diameter of the chamber at the second end. In one embodiment, the gas is controlled by adjusting a size of the hole in the wall of the insert. In one embodiment, the gas exiting the chamber is controlled by adjusting a size of the hole in the wall of the diffuser sleeve. In one embodiment, the gas is controlled by selecting a size of the hole in the wall of the insert and selecting the size of the hole in the diffuser sleeve so that the size of the hole in the wall of the insert is not equal to the size of the hole in the diffuser sleeve. In one embodiment, the gas is controlled by selecting the size of the hole in the wall of the insert so that the size of the hole in the wall of the insert is less than the size of the hole in the wall of the diffuser sleeve. In one embodiment, the gas is controlled by adjusting a position of the hole in the wall of the insert. In one embodiment, the gas is controlled by providing more than one hole in the insert. In one embodiment, the gas exiting the chamber is controlled by providing more than one hole in the diffuser sleeve. In one embodiment, a velocity of the gas exiting the chamber is controlled. In one embodiment, the contact tip has a first end and second end and the second end has a radiused outer surface, the nozzle has a first end and a second end, the first end of the contact tip is adjacent the first end of the nozzle and the gas moves in the gas channel from the first end to the second end of the nozzle and the radiused outer surface of the second end of the contact tip reduces a disturbance of the gas as the gas flows around the second end of the contact tip. In one embodiment, a velocity of the gas in the chamber is controlled. In one embodiment, the gas is controlled by selecting a position of the hole in the wall of the diffuser so that the hole in the wall of the diffuser is axially misaligned with the hole in the wall of the diffuser sleeve. In one embodiment, the gas is controlled by selecting a position of the hole in the wall of the diffuser so that the hole in the wall of the diffuser is axially misaligned with the hole in the wall of the diffuser sleeve. In one embodiment, the chamber has opposed first and second ends having an axial length therebetween and the gas is controlled by varying a diameter of the chamber along the axial length of the chamber. In one embodiment, the second end of the chamber is adjacent the contact tip and the gas is controlled by tapering the chamber so that a diameter of the chamber at the second end is greater than a diameter of the chamber at the first end. In one embodiment, the gas is controlled by adjusting a size of the hole in the wall of the diffuser. In one embodiment, the gas exiting the chamber is controlled by adjusting a size of the hole in the wall of the diffuser sleeve. In one embodiment, the gas is controlled by selecting a size of the hole in the wall of the diffuser and a selecting a size of the hole in the diffuser sleeve so that a size of the hole in the wall of the diffuser is not equal to the size of the hole in the diffuser sleeve. In one embodiment, the gas is controlled by selecting the size of the hole in the wall of the diffuser so that the size of the hole in the wall of the diffuser is less than the size of the hole in the wall of the diffuser sleeve. In one embodiment, the gas is controlled by adjusting a position of the hole in the wall of the diffuser. In one embodiment, the gas is controlled by providing more than one hole in the diffuser. In one embodiment, a velocity of the gas exiting the chamber is controlled. In one embodiment, the insert has a first and second end and the second end of the insert has an indention with a radiused inner surface and the contact tip has a first and second end, the first end having a radiused end surface wherein the first end of the contact tip extends into the indention in the second end of the insert so that the radiused end surface of the contact tip abuts the radiused inner surface of the insert and a surface of contact between the insert and the contact tip is increased to increase the cooling of the contact tip. In one embodiment, the gas is controlled by selecting a position of the hole in the wall of the insert so that the hole in the wall of the insert is axially misaligned with the hole in the wall of the diffuser sleeve. In one embodiment, the chamber has opposed first and second ends having an axial length therebetween and the gas is controlled by varying a diameter of the chamber along the axial length of the chamber. In one embodiment, the gas is controlled by changing a size of the hole in the wall of the insert. In one embodiment, the gas is controlled by changing a size of the hole in the wall of the diffuser sleeve. In one embodiment, the gas is controlled by selecting a size of the hole in the wall of the insert and selecting a size of a hole in the diffuser sleeve so that the size of the hole in the wall of the insert is not equal to the size of the hole in the diffuser sleeve. In one embodiment, the gas is controlled by selecting the size of the hole in the wall of the insert so that the size of the hole in the wall of the insert is less than the size of the hole in the wall of the diffuser sleeve. In one embodiment, the gas is controlled by changing a position of the hole in the wall of the insert. In one embodiment, the gas is controlled by changing a position of the hole in the wall of the diffuser sleeve. In one embodiment, the gas is controlled by providing more than one hole in the insert. In one embodiment, the gas is controlled by providing more than one hole in the diffuser sleeve. In one embodiment, the diffuser has a first and second end and the second end of the diffuser has an indention with a radiused inner surface and the contact tip has a first and second end, the first end having a radiused end surface, the first end of the contact tip extends into the indention in the second end of the diffuser so that the radiused end surface of the contact tip abuts the radiused inner surface of the diffuser and a surface of contact between the diffuser and the contact tip is increased to increase cooling of the contact tip. In one embodiment, the gas is controlled by selecting a position of the hole in the wall of the diffuser so that the hole in the wall of the insert is axially misaligned with the hole in the wall of the diffuser sleeve. In one embodiment, the chamber has opposed first and second ends having an axial length therebetween and the gas is controlled by varying a diameter of the chamber along the axial length of the chamber. In one embodiment, the gas is controlled by selecting a size of the hole in the wall of the diffuser and selecting a size of a hole in the diffuser sleeve so that the size of the hole in the wall of the diffuser is not equal to the size of the hole in the diffuser sleeve. In one embodiment, the gas is controlled by selecting the size of the hole in the wall of the diffuser so that the size of the hole in the wall of the diffuser is less than the size of the hole in the wall of the diffuser sleeve. In one embodiment, the gas is controlled by changing a position of the hole in the wall of the diffuser. In one embodiment, the gas is controlled by providing more than one hole in the diffuser.

The substance and advantages of the present invention will become increasingly apparent by reference to the following drawings and the description.

BRIEF DESCRIPTION OF THE SEVERAL VIEWS OF THE DRAWINGS

FIG. 5 is a side view of one embodiment of the contact tip 32 showing the radiused first end 32D and the buttress threads 32C adjacent the radiused second end 32D.

FIG. 6 is a is a side view of one embodiment of the insert 40.

FIG. 7 is a perspective view of one embodiment of the insert 40

DETAILED DESCRIPTION OF THE INVENTION

Figure 1:
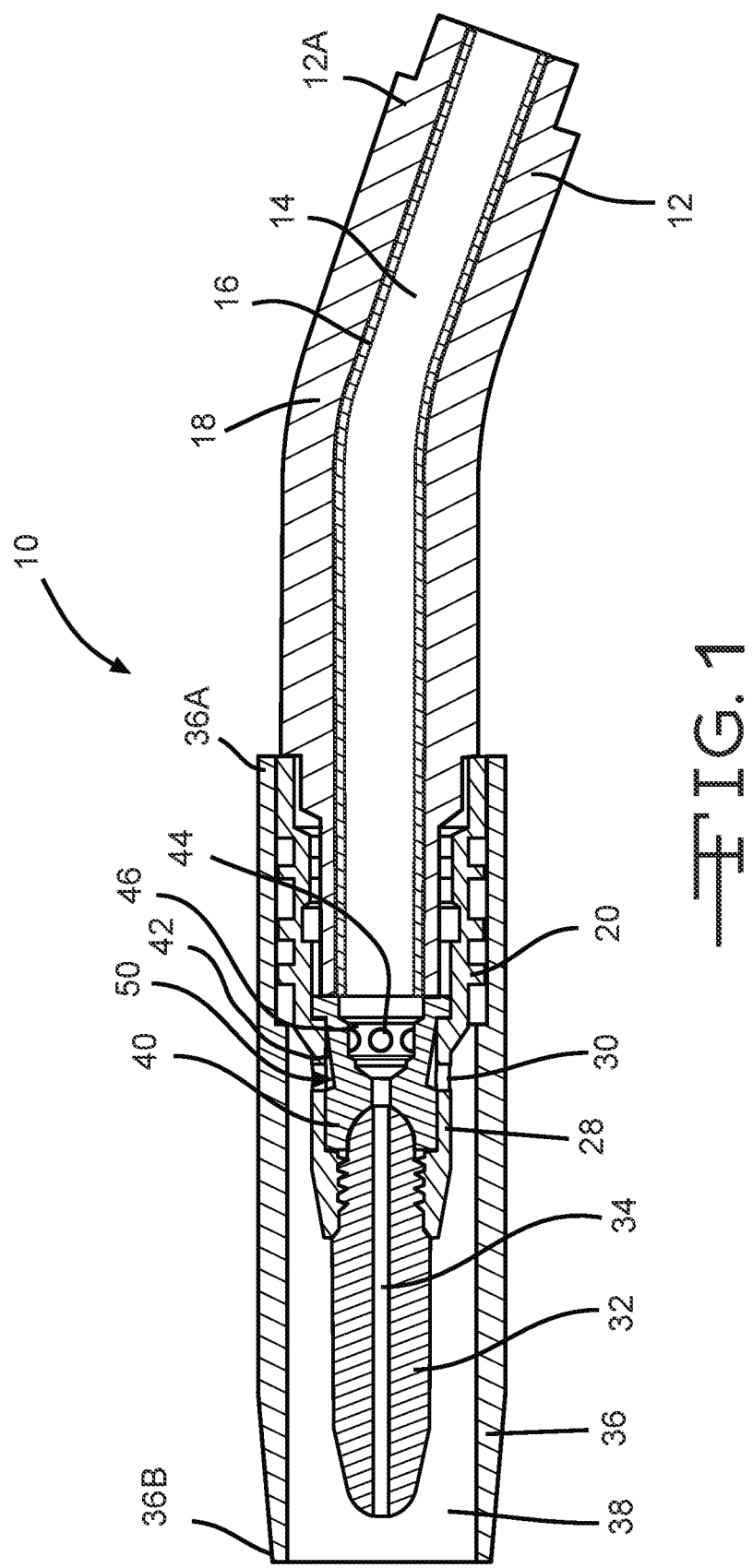
FIG. 1 is a cross section view of one embodiment of the end assembly 10 showing the gooseneck 12, the diffuser sleeve 20, the insert 40, the chamber 50, the contact tip 32 and the nozzle 36.
Figure 2:
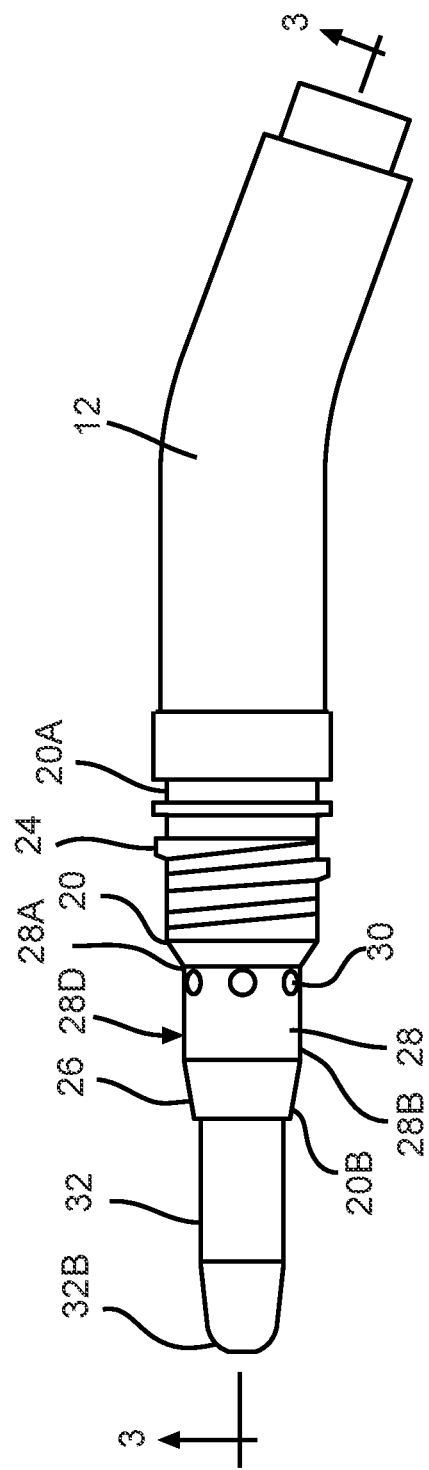
FIG. 2 is a side view of one embodiment of the end assembly 10 without the nozzle 36 showing the gooseneck 12, the diffuser sleeve 20 and the contact tip 32.
Figure 11:
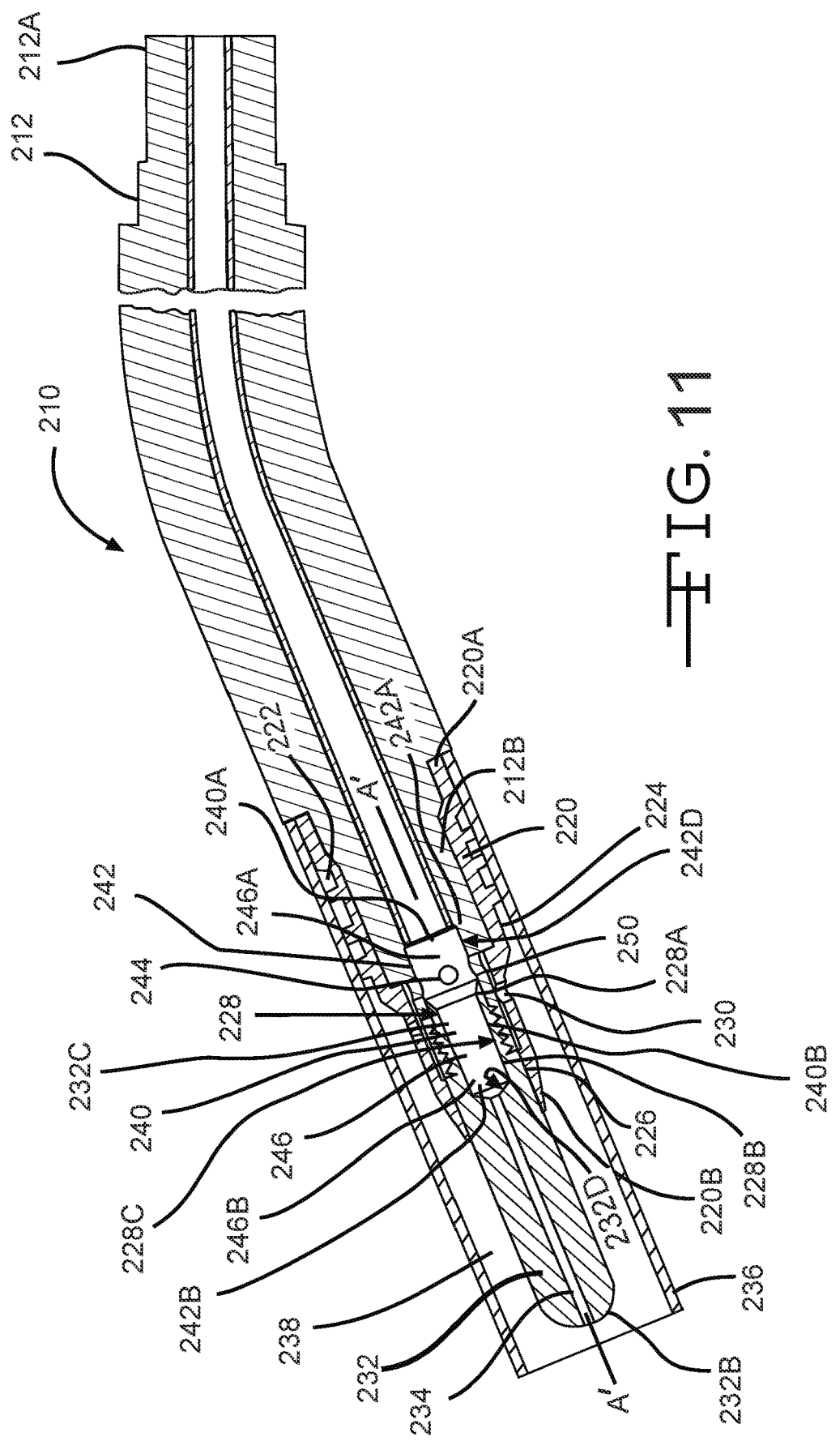
FIG. 11 is a cross section view of a second embodiment showing the gooseneck 212, the diffuser sleeve 220, the contact tip 232 and the nozzle 236 and showing the diffuser 240 not in cross section.
Figure 13:
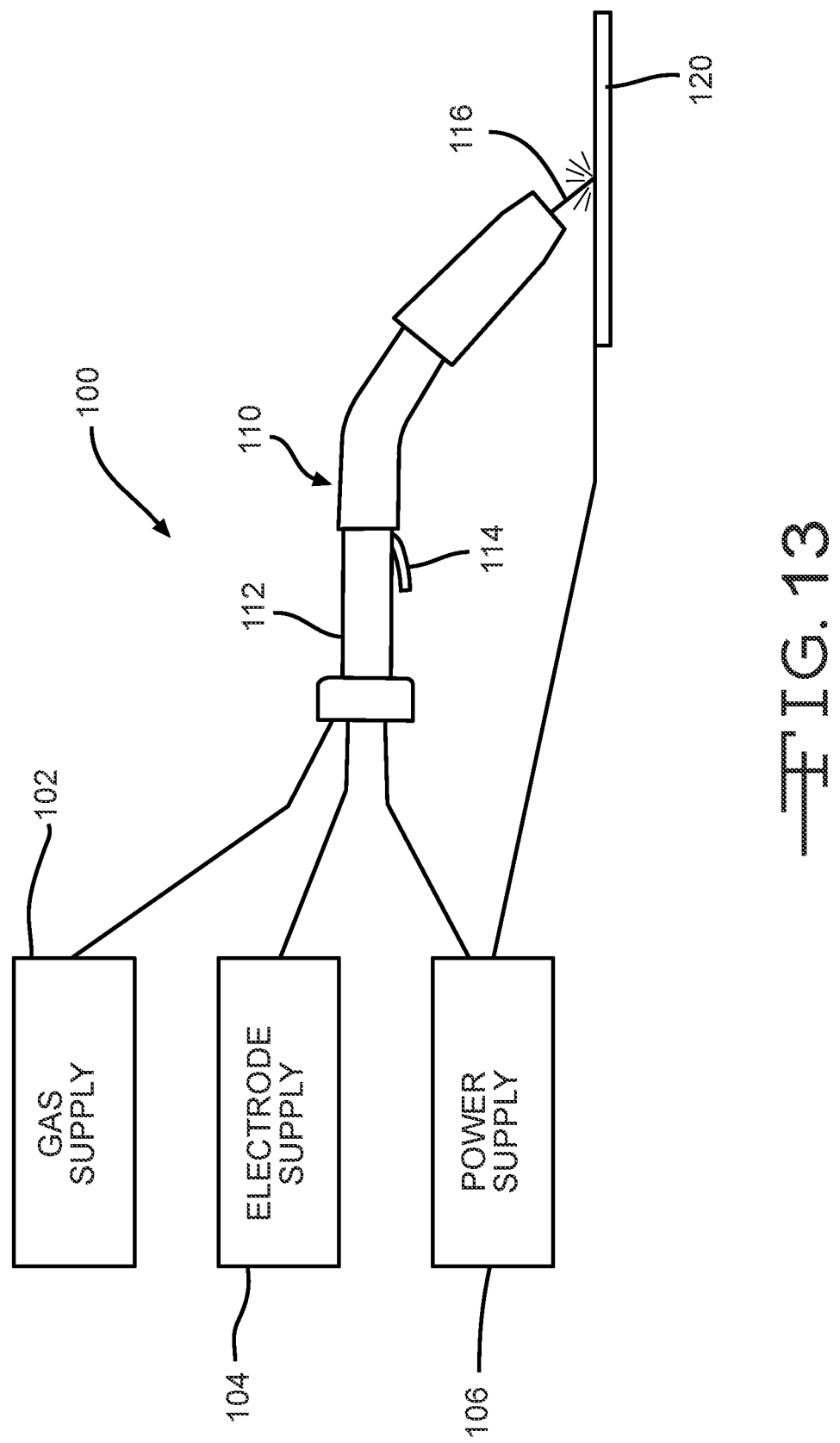
FIG. 13 is a schematic view of a welding system 100 showing the welding device 110 connected to the gas supply 102, the electrode supply 104 and power supply 106.
Figure 14:
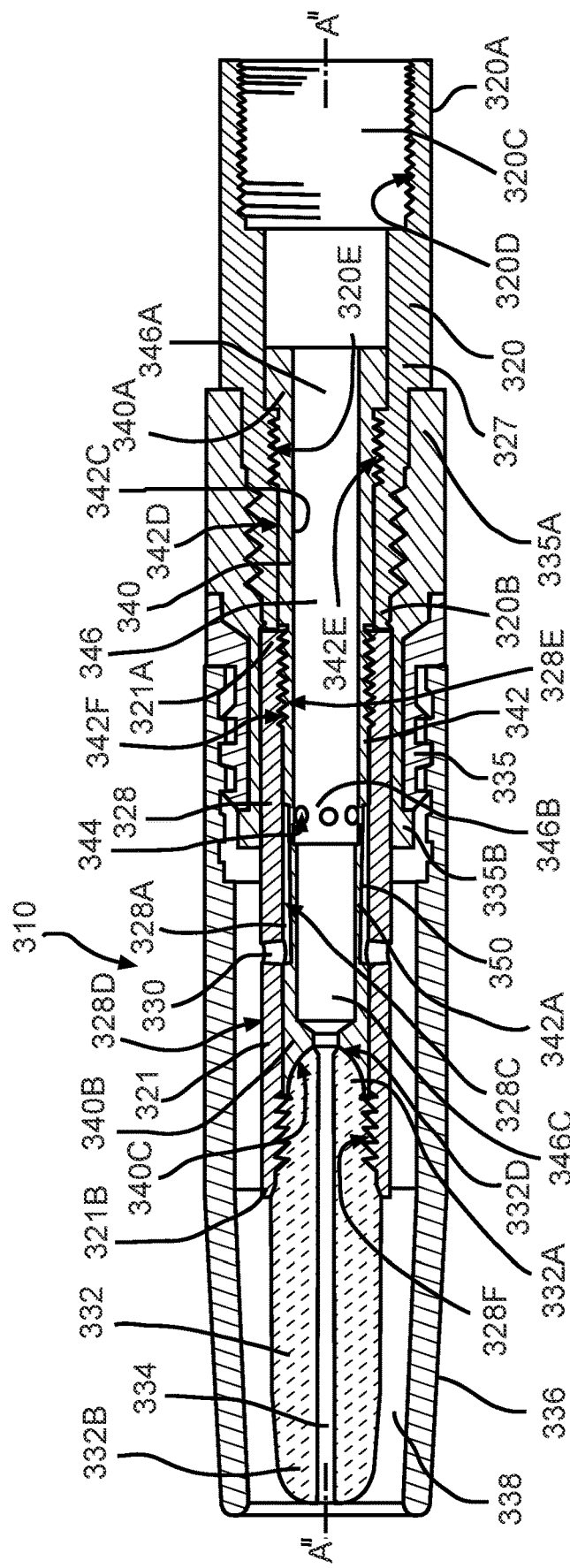
FIG. 14 is a cross section view of a third embodiment showing the diffuser sleeve 321, the insert 340 and the contact tip 332.

FIG. 13 is a general, schematic representation of a MIG welding system 100. The welding system 100 includes a gas supply 102, an electrode supply 104, and a power supply 106 connected to a welding device 110. In general the welding device 110 includes a handle 112, a gooseneck 12 or 212 and an end assembly 10, 210 or 310. The welding system 100 also includes an activation switch which, in one embodiment, is a trigger 114 on the handle 112 of the welding device 110. It is understood that the welding system 100 can be activated similar to any welding system well known in the art. FIG. 1 shows one embodiment of the first embodiment of the end assembly 10 of the present invention having a gooseneck 12, a diffuser sleeve 20, an insert 40, a contact tip 32 and a nozzle 36. FIG. 11 shows one embodiment of an alternative embodiment of the end assembly 210 of the present invention having a gooseneck 212, a diffuser 240, a diffuser sleeve 220, a contact tip 232 and a nozzle 236. FIG. 14 shows another embodiment of the end assembly 310 of the present invention having a gooseneck (not shown), a diffuser sleeve 321, an insert 340, a contact tip 332 and a nozzle 336.

In the first embodiment of the present invention, the gooseneck 12 has opposed first and second ends 12A and 12B with a passageway 14 extending therebetween. The first end 12A of the gooseneck 12 is connected to the handle 112 of the welding device 110. The gooseneck 12 includes an inner conduit 16 which extends between the ends 12A and 12B and forms the passageway 14. The inner conduit 16 is constructed of a conductive material. In one embodiment, the inner conduit 16 is constructed of copper. In one embodiment, the inner conduit 16 is a flexible cable having a center bore. The gooseneck 12 also includes an outer housing 18 or covering which protects the inner conduit 16. The passageway 14 of the gooseneck 12 is sized to enable the electrode 116 and gas 118 to move through the passageway 14 from the first end 12A to the second end 12B of the gooseneck 12.

In one embodiment, the gooseneck 12 is similar to a gooseneck well known in the art.

The diffuser sleeve 20 has opposed first and second ends 20A and 20B with a wall 28 therebetween forming an inner cavity 22 extending therebetween along a longitudinal axis A-A of the diffuser sleeve 20. The first end 20A of the diffuser sleeve 20 is mounted on the second end 12B of the gooseneck 12. The inner cavity 22 extends between the open first end 20A and the open second end 20B. The size and shape of the inner cavity 22 of the diffuser sleeve 20 varies depending on the type of gooseneck 12, the size of the insert 40 and the type of contact tip 32 used in the end assembly 10. In one embodiment, the inner cavity 22 at the first end 22A has an essentially cylindrical shape to connect to the essentially cylindrical shaped second end 12B of the gooseneck 12. In one embodiment, the inner cavity 22 adjacent the first end 20A of the diffuser sleeve 20 has threads and the outer surface of the second end 12B of the gooseneck 12 has threads and the diffuser sleeve 20 is threadably connected to the second end 12B of the gooseneck 12. In one embodiment, the second end 12B of the gooseneck 12 is press fit into the inner cavity 22 of the diffuser sleeve 20 at the first end 20A. It is understood that the diffuser sleeve 20 can be secured on the second end 12B of the gooseneck 12 by any means well known in the art. The diffuser sleeve 20 includes a first portion 24 adjacent the first end 20A and a second portion 26 adjacent the second end 20B. In one embodiment, the diameter of the second portion 26 of the diffuser sleeve 20 is less than the diameter of the first portion 24 of the diffuser sleeve 20. The wall 28 has a first end 28A adjacent the first portion 24 of the diffuser sleeve 20 and a second end 28B adjacent the second portion 26 of the diffuser sleeve 20 with an inner surface 28C and an outer surface 28D extending between the ends 28A and 28B with a length between the ends 28A and 28B extending along the longitudinal axis A-A of the diffuser sleeve 20. In one embodiment, an inner surface 28C of the wall 28 is tapered. In one embodiment, a thickness of the wall 28 along the length of the diffuser sleeve 20 is constant. In one embodiment, the thickness of the wall 28 varies along the length. In one embodiment, the inner cavity 22 along the length of the wall 28 has a cylindrical shape. In one embodiment, the wall 28 is tapered such that the thickness of the wall 28 increases along the length of the wall 28 from the first end 28A adjacent the first portion 26 to the second end 28B adjacent the second portion 28 of the diffuser sleeve 20. The wall 28 has a least on hole 30. In one embodiment, the wall 28 has a plurality of holes 30 spaced around the perimeter of the wall 28. The holes 30 in the wall 28 are in fluid communication with the inner cavity 22. In one embodiment, the holes 30 are evenly spaced around the perimeter of the wall 28. In one embodiment, the wall 28 has a cylindrical shape along the length and the holes 30 are spaced around a circumference of the wall 28 along a common plane perpendicular to the longitudinal axis A-A of the diffuser sleeve 20. In one embodiment, the wall 28 has more than one hole 30 and different holes 30 are located at different positions along the length of the wall 28 and are spaced around a circumference of the wall 28 such that the holes 30 are located in more than one plane perpendicular to the longitudinal axis A-A of the diffuser sleeve 20. In one embodiment, the inner cavity 22 adjacent the wall 28 has an essentially cylindrical shape. In one embodiment, the outer surface of the first portion 26 of the diffuser sleeve 20 is provided with threads for mounting the nozzle 36 on the diffuser sleeve 20. In one embodiment the outer surface of first portion 26 of the diffuser sleeve 20 is provided with gripping flats for gripping the diffuser sleeve 20 to secure the diffuser sleeve 20 onto the gooseneck 12. The interior surface of the inner cavity 22 adjacent the second end 20B of the diffuser sleeve 20 has threads 31. In one embodiment, the threads 31 are buttress threads. In one embodiment, the diffuser sleeve 20 is constructed of a poorly conductive or nonconductive material or of a material less conductive than the material used to construct the insert 40 and the contact tip 32. In one embodiment, the diffuser sleeve 20 is constructed of a material dissimilar to the material used to construct the insert 40 and the contact tip 32. In one embodiment, the diffuser sleeve 20 is constructed of brass. In one embodiment, the diffuser sleeve 20 is constructed of 360 half hard brass. In one embodiment, the diffuser sleeve 20 is constructed of ceramic. In one embodiment, the diffuser sleeve 20 is constructed of a high temperature polymer. In one embodiment, the diffuser sleeve 20 is constructed of a ferrous material. In one embodiment, the diffuser sleeve 20 is constructed of a non-ferrous material. The contact tip 32 has a first end 32A and a second end 32B with a center bore 34 extending therebetween. The first end 32B of the contact tip 32 is connected to the second end 20B of the diffuser sleeve 20. The first end 32A of the contact tip 32 extends into the inner cavity 22 of the diffuser sleeve 20 at the second end 20B of the diffuser sleeve 20. The center bore 34 of the contact tip 32 extends along the longitudinal axis of the contact tip 32. When the contact tip 32 is secured in the second end 20B of the diffuser sleeve 20, the center bore 34 of the contact tip 32 is coaxial with the longitudinal axis A-A of the diffuser sleeve 20. In one embodiment, the first end 32A of the contact tip 32 has threads 32C which mate with threads 31 on the interior surface of the inner cavity 22 of the diffuser sleeve 20. In one embodiment, the threads 32C of the contact tip 32 are buttress threads. In one embodiment, the contact tip 32 has four (4) threads. In one embodiment, the buttress threads are American National Standards Institute 45/7 or ANSI 45/7 buttress threads. In one embodiment, the buttress threads are 5/16-20 buttress threads with a 0.304 inch (7.72 mm) diameter major and a 0.326 inch (8.28 mm)+/−0.002 inch (0.051 mm) pitch diameter using 0.029 inch (0.737 mm) diameter pins. In one embodiment, the pitch of the threads 32C is at a 60 degree angle and the threads 32C have a diameter of 0.312 inches (7.92 mm). In one embodiment, the first end 32A of the contact tip 32 has a radiused outer end surface 32D. In one embodiment, the first end 32A of the contact tip 32 is elongated with the threads 32C spaced apart from the first end 32A of the contact tip 32. In one embodiment, the second end 32B of the contact tip 32 is radiused or rounded or curved. In one embodiment, the first end 32A of the contact tip 32 has a first section and a second section (FIG. 5). The first section is located adjacent the first end 32A of the contact tip 32 and the second section is spaced between the first section and the threads 32C. In one embodiment, the first and second sections are tapered. In one embodiment, a diameter of the second section adjacent the threads 32C is greater than a diameter of the second section adjacent the first section. In one embodiment, the second section tapers from a diameter of about 0.257 inches (6.53 mm) adjacent the threads 32C to a diameter of about 0.160 inches (4.064 mm) adjacent the first section. In one embodiment, the radius of the second section is greater than the radius of the first section. In one embodiment, the radius of the first section is about 0.094 inches (2.38 mm) and the radius of the second section is about 0.375 inches (9.53 mm). In one embodiment, the second end 32B of the contact tip 32 has a first section and a second section. The second section is adjacent the second end 32B of the contact tip 32 and the first section is spaced between the second section and the body of the contact tip 32. The first section of the second end 32B of the contact tip 32 is tapered so that the portion of the first section adjacent the first end 32A of the contact tip 32 has a diameter greater than the portion of the first section adjacent the second end 32B of the contact tip 32. In one embodiment, the first section of the second end 32B of the contact tip 32 tapers from a diameter of about 0.351 inches (8.42 mm) adjacent the first end 32A to a diameter of about 0.303 inches (7.70 mm) adjacent the second section and the second end 32B of the contact tip 32. In one embodiment, the second section of the second end 32B of the contact tip 32 is radiused. In one embodiment, the second section of the second end 32B of the contact tip 32 has a radius of about 0.125 inches (3.18 mm). In one embodiment, the contact tip 32 has a length between the ends 32A and 32B of essentially 1.492 inches (37.89 mm). In one embodiment, the second section of the first end 32A of the contact tip 32 is spaced about 0.037 inches (0.93 mm) from the first end 32A of the contact tip 32 and has a length of about 0.126 inches (3.20 mm). In one embodiment, the threads 32C are immediately adjacent the second section of the first end 32A of the contact tip 32. In one embodiment, the first section of the second end 32B of the contact tip 32 is spaced about 1.132 inches (28.74 mm) from the first end 32A of the contact tip 32 and has a length of about 0.251 inches (6.375 mm). In one embodiment, the second section of the second end 32B of the contact tip 32 has a length of about 0.109 inches (2.76 mm). In one embodiment, the second section of the second end 32B of the contact tip 32 has a radius of about 0.125 inches (3.18 mm). In one embodiment, the contact tip 32 has a band formed by grooves in the outer surface of the contact tip 32 spaced between the first and second ends 32A and 32B adjacent the first section of the second end 32B. In one embodiment, the band has a length along the length of the contact tip 32 of essentially 0.030 inches (0.75 mm). In one embodiment, the contact tip 32 is constructed of conductive material. In one embodiment, the contact tip 32 is constructed of copper. In one embodiment, the contact tip 32 is constructed of tempered copper. In one embodiment, the contact tip 32 is constructed of deoxidized high phosphorous copper (DHP) 122.

The nozzle 36 has a first end 36A and an open second end 36B with a gas channel 38 extending therebetween. The first end 36A of the nozzle 36 is connected to the first portion 24 of the diffuser sleeve 20. When the nozzle 36 is secured on the diffuser sleeve 20, the nozzle 36 extends outward from the first end 36A along the diffuser sleeve 20 toward the second end 36B and toward the second portion 26 of the diffuser sleeve 20 so that the wall 28 of the diffuser sleeve 20 is in the gas channel 38 and the hole 30 in the wall 28 of the diffuser sleeve 20 is in fluid communication with the gas channel 38 of the nozzle 36. The nozzle 36 extends along the contact tip 32 so that the contact tip 32 is in the gas channel 38. In one embodiment, the second end 38B of the nozzle 38 extends beyond the second end 32B of the contact tip 32. In one embodiment, the second end 38B of the nozzle 38 is essentially even with the second end 32B of the contact tip 32. In one embodiment, the second end 32B of the contact tip 32 extends beyond the second end 36B of the nozzle 36. In one embodiment, the end of the gas channel 38 adjacent the second end 32B of the contact tip 32 is tapered inward toward the contact tip 32. The nozzle 36 is similar to nozzles well known in the art.

Figure 9:
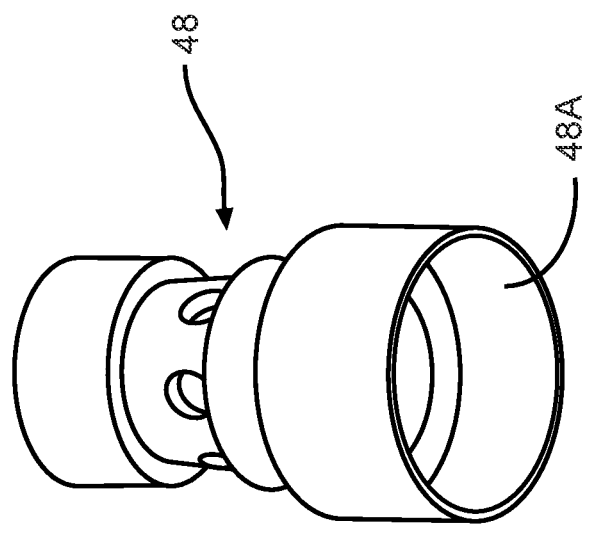
FIG. 9 is a perspective view of the embodiment of the insert 48.
Figure 8:
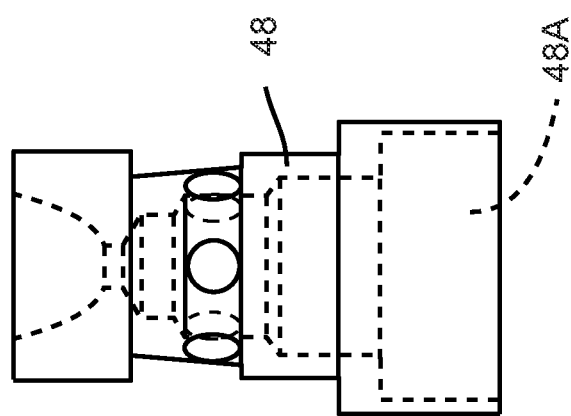
FIG. 8 is a side view of another embodiment of the insert 48.
Figure 10:
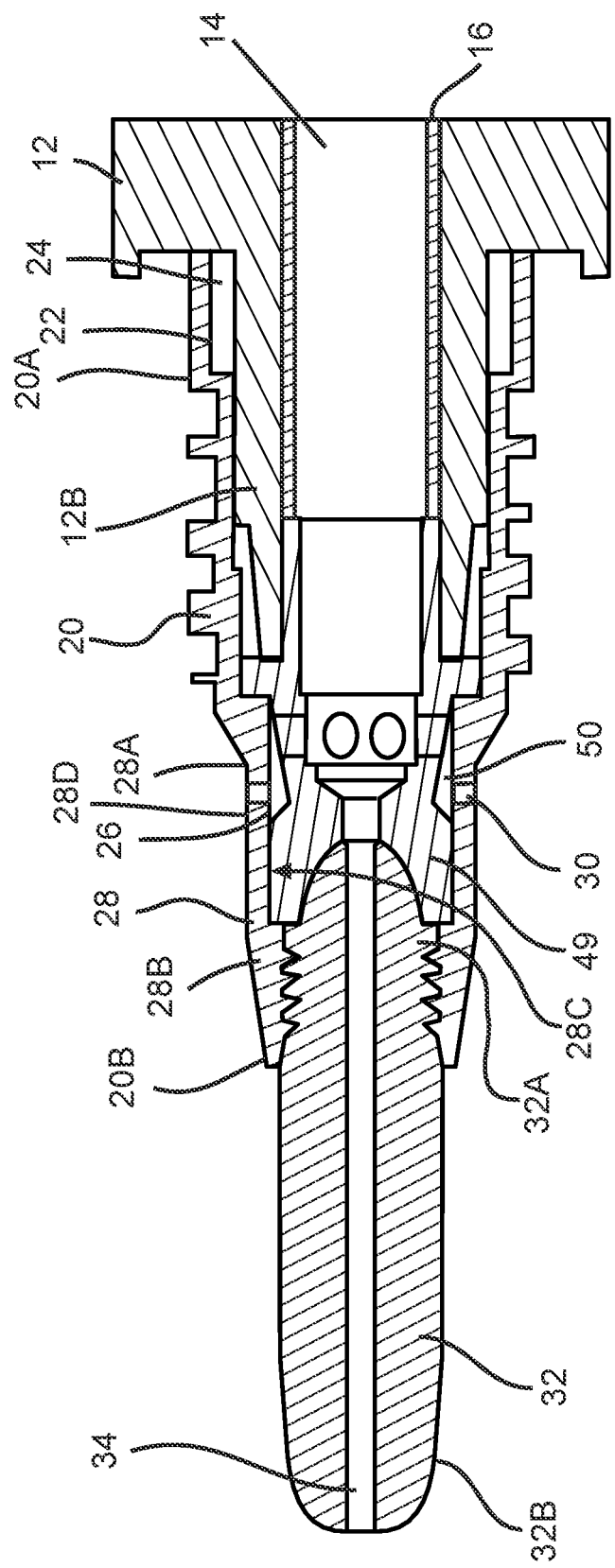
FIG. 10 is a cross section view of another embodiment of the end assembly 10 without the nozzle 36 showing the second end 12B of the gooseneck 12, the diffuser sleeve 20, the insert 49 and the contact tip 32.

The insert 40 has a first end 40A and a second end 40B with inner passageway 46 extending therebetween. The insert 40 has a first part adjacent the first end 40A and a second part adjacent the second end 40B with a wall 42 extending therebetween. The insert 40 can have a variety of shapes and sizes. The shape of the insert 40 can vary depending on the shape and size of the inner cavity 22 of the diffuser sleeve 20, the shape and size of the second end 12B of the gooseneck 12 and the shape and size of the contact tip 32. The shape and size of the insert 40 can vary depending on the specific use of the welding device 110. In one embodiment, the first part of the insert 40 is cylindrical to enable the second end 12B of the gooseneck 12 to abut against the first end 40A of the insert 40 to secure the insert 40 in position in the diffuser sleeve 20 (FIG. 1). In one embodiment, the first part of the insert 48 has a cylindrical, open first end 48A and the second end 12B of the gooseneck 12 is inserted into the first end 48A of the insert 48 to secure the insert 40 in position in the diffuser sleeve 20 (FIGS. 8 and 9). In another embodiment, the insert 48 has an elongated first part with an exterior shoulder spaced apart from the first end. In this embodiment, the elongated first part of the insert 49 extends into the passageway 14 of the gooseneck 12 and the second end 12B of the gooseneck 12 contacts the shoulder to secure the insert 49 in position in the diffuser sleeve 20 (FIG. 10).

The wall 42 of the insert 40 has a first end 42A adjacent the first part of the insert 40 and a second end 42B adjacent the second part of the insert 40 with an inner surface and an outer surface 42D extending between the ends 42A and 42B. The wall 42 has a length between the ends 42A and 42B extending along the longitudinal axis of the insert 40. In one embodiment, a thickness of the wall 42 along the length of the insert 40 is constant. In one embodiment, the thickness of the wall 42 varies along the length. In one embodiment, the wall 42 is tapered such that the thickness of the wall 42 increases along the length of the wall 42 adjacent the first part to adjacent the second part of the insert 40. In one embodiment, the outer surface 42D of the wall 42 is angled. The wall 42 has at least one hole 44 extending therethrough. In one embodiment, the wall 42 has a plurality of holes 44. In one embodiment, the wall 42 has a cylindrical shape and the holes 44 are spaced apart around a perimeter of the wall 42 of the insert 40. In one embodiment, the holes 44 are evenly spaced around the perimeter of the wall. In one embodiment, the wall 42 has a cylindrical shape along the length and the holes 44 are spaced around a circumference of the wall 42 along a common plane perpendicular to the longitudinal axis of the insert 40. In one embodiment, the insert 40 has more than one hole and different holes 44 are located at different positions along the length of the insert 40 around a circumference of the wall 42 such that the holes 44 are in more than one plane perpendicular to the longitudinal axis of the insert 40. In one embodiment, the inner passageway 46 of the insert 40 extending along the length of the wall 42 has a cylindrical shape. The holes 44 in the wall 42 are in fluid communication with the inner passageway 46 of the insert 40.

The inner passageway 46 of the insert 40 has a first section 46A, a diffuser section 46B and a second section 46C. The first section 46A is adjacent the open, first end 40A of the insert 40. The first section 46A of the inner passageway 46 is adjacent the second end 12B of the gooseneck 12 and in direct communication with the passageway 14 of the gooseneck 12. The shape and size of the first section 46A of the inner passageway 46 can vary depending on the shape and size of the second end 12B of gooseneck 12. The first section 46A of the inner passageway 46 is in fluid communication with the diffuser section 46B of the inner passageway 46. In one embodiment, the diameter of the first section 46A of the inner passageway 46 is greater than or equal to the diameter of the diffuser section 46B so that the gas 118 flows from the passageway 14 of the gooseneck 12 into the first section 46A of the inner passageway 46 and into the diffuser section 46B of the inner passageway 46 of the insert 40. In one embodiment, the wall 42 of the insert 40 extends beyond the diffuser section 46B of the inner passageway 46 to the second section 46C of the inner passageway 46. In one embodiment, the diffuser section 46B has an essentially cylindrical shape. In one embodiment, the size of diffuser section 46B decreases in a direction toward the second section 46C of the inner passageway 46. The diameter of the second section 46C of the inner passageway 46 is less than a diameter of the diffuser section 46B. The diameter of the second section 46C is greater than a diameter of the electrode 116 so that the electrode 116 can extend through the second section 46C into the center bore 34 of the contact tip 32. The second section 46C of the inner passageway 46 of the insert 40 at the second end 40B is coaxial with the center bore 34 of the contact tip 32 to enable the electrode 116 to move smoothly through the inner passageway 46 of the insert 40 into the center bore 34 of the contact tip 32. In one embodiment, the second end 40B of the insert 40 has an indention 40C with an inner surface 40D. In one embodiment, the indention 40C is radiused having a radiused inner surface 40D. In one embodiment, the inner surface 40D is radiused similar to the first end 32A of the contact tip 32. In one embodiment, the indention 40C has a first section spaced apart from the first end 40A of the insert 40 and a second section spaced adjacent the second end 40B of the insert 40. In one embodiment, the radii of the inner surfaces 40B of the first and second sections of the indention 40C correspond and match the radii of the outer surfaces of the first and second sections of the first end 32A of the contact tip 32. The first section of the indention 40C has a concave radiused inner surface which matches the convex outer surface of the first section of the first end 32A of the contact tip 32. In one embodiment, the inside contour of the first section of the indention 40C has a radius of about 0.094 inches (2.38 mm) and the second section of the indention 40C has an inside contour of about 0.375 inches (9.53 mm). In one embodiment, the length of the indention 40C is essentially equal to the length of the first and second sections of the first end 32A of the contact tip 32. In one embodiment, the length of the first section of the indention 40C is essentially equal to the length of the first section of the first end 32A of the contact tip 32 and the length of the second section of the indention 40C is essentially equal to the length of the second section of the first end 32A of the contact tip 32. In one embodiment, the insert 40 is constructed of a conductive material. In one embodiment, the insert 40 is constructed of copper. In one embodiment, the insert 40 is constructed of tempered copper. In one embodiment, the insert 40 is constructed of C110 copper.

The insert 40 is positioned in the inner cavity 22 of the diffuser sleeve 20 axially spaced between the contact tip 32 and second end 12B of the gooseneck 12. When the insert 40 is secured in the diffuser sleeve 20, the insert 40 is coaxial with the diffuser sleeve 20. The insert 40 is positioned in the inner cavity 22 of the diffuser sleeve 20 so that the wall 42 of the insert 40 is axially adjacent or essentially at the same position along the longitudinal axis A-A of the diffuser sleeve or the longitudinal axis of the end assembly 10 as the wall 28 of the diffuser sleeve 20. The outer surface 42D of the wall 42 of the insert 40 is spaced apart from the inner surface 28C of the wall 28 of the diffuser sleeve 20 forming a chamber 50 positioned between the wall 42 of the insert 40 and the wall 28 of the diffuser sleeve 20. The chamber 50 has a length extending along the longitudinal axis of the end assembly 10. In one embodiment, the outer surface 42D of the wall 42 of the insert 40 is angled along an axial length and the chamber 50 along the length is tapered. In one embodiment, the inner surface 28D of the wall 28 of the diffuser sleeve 20 is angled along an axial length and the chamber 50 is tapered along the length. In one embodiment, the length of the wall 42 of the insert 40 is varied to change the length of the chamber 50. In one embodiment, the length of the wall 28 of the diffuser sleeve 20 is varied to change the length of the chamber 50. In one embodiment, the length of the wall 42 of the insert 40 is not equal to the length of the wall 28 of the diffuser sleeve 20. In one embodiment, a shape of the outer surface 42D of the wall 42 of the insert 40 is varied to change or adjust the shape and size of the chamber 50. In one embodiment, the inner surface 28C of the wall 28 of the diffuser sleeve 20 is varied to change the size and shape of the chamber 50. In one embodiment, the diameter of the chamber 50 adjacent the first end 40A of the insert 40 is less than the diameter of the chamber 50 adjacent the second end 40B of the insert 40. The holes 44 in the wall 42 of the insert 40 and the holes 30 in the wall 28 of the diffuser sleeve 20 are in fluid communication with the chamber 50. In one embodiment, the holes 44 in the wall 42 of the insert 40 are perpendicular to the longitudinal axis of the insert 40. In one embodiment, the holes 44 in the wall 42 of the insert 40 are angled with respect to the longitudinal axis of the insert 40. In one embodiment, the holes 30 in the wall 28 of the diffuser sleeve 20 are perpendicular to the longitudinal axis A-A of the diffuser sleeve 20. In one embodiment, the holes 30 in the wall 28 of the diffuser sleeve 20 are angled with respect to the longitudinal axis A-A of the diffuser sleeve 20. In one embodiment, when the insert 40 is positioned in the diffuser sleeve 20, the holes 44 in the wall 42 of the insert 40 are not axially aligned or are axially misaligned or offset from the holes 30 in the wall 28 of the diffuser sleeve 20. In one embodiment, when the insert 40 is positioned in the diffuser sleeve 20, the holes 44 in the wall 42 of the insert 40 and the holes 30 in the wall 28 of the diffuser sleeve 20 are not in the same plane perpendicular to the longitudinal axis of the end assembly 10. In one embodiment, when the insert 40 is positioned in the diffuser sleeve 20, the holes 44 in the wall 42 of the insert 40 are axially spaced apart from the holes 30 in the wall 28 of the diffuser sleeve 20. In one embodiment, when the insert 40 is positioned in the diffuser sleeve 20, the holes 44 in the wall 42 of the insert 40 are axially positioned between the first end 20A of the diffuser sleeve 20 and the holes 30 in the wall 28 of the diffuser sleeve 20. In another embodiment, when the insert 40 is positioned in the diffuser sleeve 20, the holes 30 in the diffuser sleeve 20 are axially positioned between the first end 20A of the diffuser sleeve 20 and the holes 44 in the wall 42 of the insert 40. In one embodiment, the diameter of the holes 30 in the wall 28 of the diffuser sleeve 20 is greater than the diameter of the holes 44 in the wall 42 of the insert 40. In one embodiment, the diameter of the holes 30 in the wall 28 of the diffuser sleeve 20 is less than the diameter of the holes 44 in the wall 42 of the insert 40. In one embodiment, the diameter of the holes 30 in the wall 28 of the diffuser sleeve 20 is essentially equal to the diameter of the holes 44 in the wall 42 of the insert 40. In one embodiment, the number of holes 30 in the wall 28 of the diffuser sleeve 29 is equal to the number of holes 42 on the wall 42 of the insert 40. In one embodiment, the number of holes 30 in the wall 28 of the diffuser sleeve 20 is less than the number of holes 44 in the wall 42 of the insert 40. In one embodiment, the number of holes 30 in the wall 28 of the diffuser sleeve 20 is greater than the number of holes 44 in wall 42 of the insert 40. It is understood that the number and diameter of the holes 30 in the wall 28 of the diffuser sleeve 20 and number and diameter of the holes 44 in the wall 42 of the insert 40 can vary depending of the use of the welding device 110, the type of gas 118 used during welding, the material used to construct the contact tip 32, the material used to construct the insert 40 and the amount of current used during welding as well as other variables.

In the second embodiment of the present invention, the gooseneck 212 has a first end 212A and a second end 212B with an inner conduit 216 extending between the ends 212A and 212B forming the passageway 214. In one embodiment the gooseneck 212 is flexible and the inner conduit 216 is a flexible cable. The inner conduit 216 is constructed of a conductive material. In one embodiment, the inner conduit 216 is constructed of copper. The diffuser 240 is connected to the second end 212B of the gooseneck 212. In one embodiment, the diffuser 240 is separate but in contact with the inner conduit 216 at the second end 212B of the gooseneck 212. In one embodiment, the diffuser 240 is threadably connected to the second end 212B of the gooseneck 212. In one embodiment, the diffuser 240 is an integral part of the inner conduit 216 at the second end 212B of the gooseneck 212. In one embodiment, the diffuser 240 is constructed of the same material as the inner conduit 216. In one embodiment, the diffuser 240 is constructed of a conductive material. In one embodiment, the diffuser 240 is constructed of copper. In one embodiment, the diffuser 240 is constructed of tempered copper.

The diffuser 240 has a first end 240A and a second end 240B with inner passageway 246 and a wall 242 extending therebetween. The first end 240A of the diffuser 240 is connected to the second end 212B of the gooseneck 212. The diffuser 240 can have a variety of shapes and sizes. The shape of the diffuser 240 can vary depending on the shape and size of the inner cavity 222 of the diffuser sleeve 220, the shape and size of the second end 212B of the gooseneck 212 and the shape and size of the contact tip 232. The shape and size of the diffuser 240 can vary depending on the specific use of the welding device 110. The wall 242 has a first end 242A adjacent gooseneck 212 and an opposed second end 242B with an inner surface and an outer surface 242D extending between the ends 242A and 242B. The wall 242 has a length between the ends 242A and 242B extending along the longitudinal axis of the diffuser 240. In one embodiment, a thickness of the wall 242 along the length of the diffuser 240 is constant. In one embodiment, the thickness of the wall 242 varies along the length. In one embodiment, the wall 242 is tapered such that the thickness of the wall 242 decreases along the length of the wall 242 from adjacent the first end 240A to adjacent the second end 204B of the diffuser 240. In one embodiment, the outer surface of the wall 242 is angled. The wall 242 has at least one hole 244 extending therethrough. The hole 244 is in fluid communication with the inner passageway 246 of the diffuser 240. In one embodiment, the wall 242 has a plurality of holes 244. In one embodiment, the wall 242 has a cylindrical shape and the holes 244 are spaced apart around a perimeter of the wall 242 of the diffuser 240. In one embodiment, the holes 244 are evenly spaced around the perimeter of the wall 242. In one embodiment, the wall 242 has a cylindrical shape along the length and the holes 244 are spaced around a circumference of the wall 242 along a common plane perpendicular to the longitudinal axis of the diffuser 240. In one embodiment, the diffuser 240 has more than one hole 244 and different holes 244 are located at different positions along the length of the diffuser 240 and are spaced around a circumference of the wall 242 such that the holes 244 are in more than one plane perpendicular to the longitudinal axis of the diffuser 240.

The inner passageway 246 of the diffuser 240 has a first, diffuser section 246A adjacent the first end 240A and a second section 246B adjacent the second end 240B of the diffuser 240. The first, diffuser section 246A of the inner passageway 246 is adjacent the second end 212B of the gooseneck 212 and in direct communication with the passageway 214 of the gooseneck 212. The shape and size of the first diffuser section 246A of the inner passageway 246 can vary depending on the shape and size of the second end 212B of gooseneck 212. In one embodiment, the first diffuser section 246A of the inner passageway 246 of the diffuser 240 extends along the length of the wall 242 and has a cylindrical shape. In one embodiment, the diameter of the first diffuser section 246A of the inner passageway 246 is greater than the diameter of the second section 246B of the inner passageway 246. In one embodiment, the size of diffuser section 246A decreases in a direction toward the second section 246B of the diffuser 240. The diameter of the second section 246B is greater than a diameter of the electrode 116 so that the electrode 116 can extend through the second section 246B into the center bore 234 of the contact tip 232. The second section 246B of the inner passageway 246 of the diffuser 240 at the second end 240B is coaxial with the center bore 234 of the contact tip 232 to enable the electrode 116 to move smoothly through the inner passageway 246 of the diffuser 240 into the center bore 234 of the contact tip 232.

The diffuser sleeve 220 of the second embodiment is similar to the diffuser sleeve 20 of the first embodiment. The diffuser sleeve 220 has opposed first and second ends 220A and 220B with an inner cavity 222 extending therebetween along a longitudinal axis A'-A' of the diffuser sleeve 220. The diffuser sleeve 220 has a first portion 224 adjacent the first end 220A and a second portion 226 adjacent the second end 220B with a wall 228 extending between the first portion 226 and the second portion 228. In one embodiment, the diameter of the second portion 226 of the diffuser sleeve 220 is less than the diameter of the first portion 224 of the diffuser sleeve 220. The wall 228 has a first end 228A adjacent the first portion 224 of the diffuser sleeve 220 and a second end 228B adjacent the second portion 226 of the diffuser sleeve 220 with an inner surface 228C and an outer surface 228D extending between the ends 228A and 228B with a length between the ends 228A and 228B extending along the longitudinal axis A'-A' of the diffuser sleeve 220. In one embodiment, an inner surface 228C of the wall 228 is tapered. In one embodiment, a thickness of the wall 228 along the length of the diffuser sleeve 220 is constant. In one embodiment, the thickness of the wall 228 varies along the length. In one embodiment, the inner cavity 222 along the length of the wall 228 has a cylindrical shape. In one embodiment, the wall 228 is tapered such that the thickness of the wall 228 increases along the length of the wall 228 from the first end 228A adjacent the first portion 224 to the second end 228B adjacent the second portion 226 of the diffuser sleeve 220. The wall 228 has a least one hole 230. In one embodiment, the wall 228 has a plurality of holes 230 spaced around the perimeter of the wall 228. The holes 230 in the wall 228 are in fluid communication with the inner cavity 222. In one embodiment, the holes 230 are evenly spaced around the perimeter of the wall 228. In one embodiment, the wall 228 has a cylindrical shape along the length and the holes 230 are spaced around a circumference of the wall 228 along a common plane perpendicular to the longitudinal axis A'-A' of the diffuser sleeve 220. In one embodiment, the wall 228 of the diffuser sleeve 220 has more than one hole 230 and different holes 230 are located at different positions along the length of the diffuser sleeve 220 and are spaced around a circumference of the wall 228 so that the holes are located in more than one plane perpendicular to the longitudinal axis A'-A' of the diffuser sleeve 220.

The diffuser sleeve 220 is secured on the second end 212B of the gooseneck 212 so that the second end 212B of the gooseneck 212 extends into the inner cavity 222 at the first end 220A of the diffuser sleeve 220. It is understood that the diffuser sleeve 220 can be secured on the second end 212B of the gooseneck 212 by any means well known in the art. The diffuser sleeve 220 is positioned on the second end 212B of the gooseneck 212 so that the wall 228 of the diffuser sleeve 220 is axially adjacent the wall 242 of the diffuser 240 or essentially at the same position along the longitudinal axis A'-A' of the diffuser sleeve 220 or the longitudinal axis of the end assembly 210 as the wall 228 of the diffuser sleeve 220. When the diffuser sleeve 220 is secured on the gooseneck 212, the wall 228 of the diffuser sleeve 220 is spaced apart from the wall 242 of the diffuser 240 forming a chamber 250 positioned between the wall 228 of the diffuser sleeve 220 and the wall 242 of the diffuser 240. The outer surface 242D of the wall 242 of the diffuser 240 is spaced apart from the inner surface 228C of the wall 228 of the diffuser sleeve 220 forming the chamber 250. In one embodiment, the outer surface 242D of the wall 242 of the diffuser 240 is angled along an axial length so that the chamber 250 is tapered along the length. In one embodiment, the length of the wall 242 of the diffuser 240 is varied to change the length of the chamber 250. In one embodiment, the length of the wall 228 of the diffuser sleeve 220 is varied to change the length of the chamber 250. In one embodiment, the length of the wall 242 of the diffuser 240 is not equal to the length of the wall 228 of the diffuser sleeve 220. In one embodiment, the shape of the outer surface 242D of the wall 242 of the diffuser 240 is varied to change or adjust the shape and size of the chamber 250. In one embodiment, the inner surface 228C of the wall 228 of the diffuser sleeve 220 is varied to change a size and shape of the chamber 250. In one embodiment, the chamber 250 extends along the longitudinal axis A'-A' of the diffuser sleeve 220 and the diameter of the chamber 250 adjacent the first end 240A of the diffuser 240 is less than the diameter of the chamber 250 adjacent the second end 240B of the diffuser 240. The holes 244 in the wall 242 of the diffuser 240 and the holes 230 in the wall 228 of the diffuser sleeve 220 are in fluid communication with the chamber 250. In one embodiment, the holes 244 in the wall 242 of the diffuser 240 are perpendicular to the longitudinal axis A'-A' of the diffuser 240. In one embodiment, the holes 244 in the wall 242 of the diffuser 240 are angled with respect to the longitudinal axis A'-A' of the diffuser 240. In one embodiment, the diffuser 240 is positioned in the diffuser sleeve 220 so that the holes 244 in the wall 242 of the diffuser 240 are not axially aligned or are axially misaligned of axially offset with the holes 230 in the wall 228 of the diffuser sleeve 220. In one embodiment, when the diffuser 240 is positioned in the diffuser sleeve 220, the holes 244 in the wall 242 of the diffuser 240 and the holes 230 in the wall 228 of the diffuser sleeve 220 are not in the same plane perpendicular to the longitudinal axis of the end assembly 210. In one embodiment, when the diffuser 240 is positioned in the diffuser sleeve 220, the holes 244 in the wall 242 of the diffuser 240 are axially spaced apart from the holes 230 in the wall 228 of the diffuser sleeve 220. In one embodiment, when the diffuser 240 is positioned in the diffuser sleeve 220, the holes 244 in the wall 242 of the diffuser 240 are axially positioned between the first end 220A of the diffuser sleeve 220 and the holes 230 in the wall 228 of the diffuser sleeve 220. In another embodiment, when the diffuser 240 is positioned in the diffuser sleeve 220, the holes 230 in the wall 228 of the diffuser sleeve 220 are axially positioned between the first end 220A of the diffuser sleeve 220 and the holes 244 in the wall 242 of the diffuser 240. In one embodiment, the diameter of the holes 230 in the wall 228 of the diffuser sleeve 220 is greater than the diameter of the holes 244 in the wall 242 of the diffuser 240. In one embodiment, the diameter of the holes 230 in the wall 228 of the diffuser sleeve 220 is less than the diameter of the holes 244 in the wall 242 of the diffuser 240. In one embodiment, the diameter of the holes 230 in the wall 228 of the diffuser sleeve 220 is essentially equal to the diameter of the holes 244 in the wall 242 of the diffuser 240. In one embodiment, the number of holes 230 in the wall 228 of the diffuser sleeve 220 is equal to the number of holes 244 in the diffuser 240. In one embodiment, the number of holes 230 in the wall 228 of the diffuser sleeve 220 is less than the number of holes 244 in the wall 242 of the diffuser 240. In one embodiment, the number of holes 230 in the wall 228 of the diffuser sleeve 220 is greater than the number of holes 244 in the wall 242 of the diffuser 240. It is understood that the number and diameter of the holes 230 in the wall 228 of the diffuser sleeve 220 and number and diameter of the holes 244 in the wall 242 of the diffuser 240 can vary depending of the use of the welding device 110, the type of gas 118 used during welding, the material used to construct the contact tip 232, the material used to construct the diffuser 240 and the amount of current used during welding as well as other variables. In one embodiment, the inner cavity 222 adjacent the wall 242 has an essentially cylindrical shape. In one embodiment, the diffuser sleeve 220 is constructed of a poorly conductive or non-conductive material. In one embodiment, the diffuser sleeve 220 is constructed of a material which is less conductive than the material or materials used to construct the contact tip 232 or the diffuser 240. In one embodiment, the diffuser sleeve 220 is constructed of a material dissimilar to the material used to construct the contact tip 232 and diffuser 240. In one embodiment, the diffuser sleeve 220 is constructed of brass. In one embodiment, the diffuser sleeve 220 is constructed of 360 half hard brass. In one embodiment, the diffuser sleeve 220 is constructed of ceramic. In one embodiment, the diffuser sleeve 220 is constructed of a high temperature polymer. In one embodiment, the diffuser sleeve 220 is constructed of a ferrous material. In one embodiment, the diffuser sleeve 220 is constructed of a non-ferrous material.

The contact tip 232 of the second embodiment is similar to the contact tip 32 of the first embodiment. The contact tip 232 is connected at the first end 232A to the second end 220B of the diffuser sleeve 220. The contact tip 232 can be secured to the diffuser sleeve 220 by any means well known in the art. In one embodiment of the second embodiment, the contact tip 232 extends into the inner cavity 222 of the diffuser sleeve 220 at the second end 220B of the diffuser sleeve 220. In one embodiment, the first end 232A of the contact tip 232 has an indention 232C having an inner surface 232D and the second end 240B of the diffuser 240 of the gooseneck 210 extends into the first end 232A of the contact tip 232 (FIG. 11). The contact tip 232 is secured in contact with the diffuser 240 of the gooseneck 210 by the diffuser sleeve 220. In one embodiment, the inner surface of the inner cavity 222 of the diffuser sleeve 220 at the second end 220B has threads which mate with threads on the first end 232A of the contact tip 232. In one embodiment, the contact tip 232 is constructed of conductive material. In one embodiment, the contact tip 232 is constructed of copper. In one embodiment, the contact tip 232 is constructed of tempered copper. In one embodiment, the contact tip 232 is constructed of deoxidized high phosphorous copper (DHP) 122.

The nozzle 236 has a first end 236A and an open second end 236B with a gas channel 238 extending therebetween. The first end 236A of the nozzle 236 is connected to the first portion 224 of the diffuser sleeve 220 by any means well known in the art. When the nozzle 236 is secured on the diffuser sleeve 220, the nozzle 236 extends outward from the first end 236A along the diffuser sleeve 220 toward the second end 236B and toward the second portion 226 of the diffuser sleeve 220 so that the wall 228 of the diffuser sleeve 220 is in the gas channel 238 and the hole 230 in the wall 228 of the diffuser sleeve 220 is in fluid communication with the gas channel 238 of the nozzle 236. The nozzle 236 extends along the contact tip 232 so that the contact tip 232 is in the gas channel 238. In one embodiment, the second end 238B of the nozzle 238 extends beyond the second end 232B of the contact tip 232. In one embodiment, the second end 238B of the nozzle 238 is essentially even with the second end 232B of the contact tip 232. In one embodiment, the second end 232B of the contact tip 232 extends beyond the second end 236B of the nozzle 236. In one embodiment, the second end 238B of the gas channel 238 is tapered inward toward the contact tip 232. The nozzle 236 is similar to nozzles well known in the art.

In the third embodiment of the present invention, the end assembly 310 includes a diffuser base 320 and a diffuser sleeve 321 (FIG. 14). The diffuser base 320 has a first end 320A and a second end 320B with a wall 327 extending therebetween surrounding and forming an inner cavity 320C. The first end 320A of the diffuser base 320 is connected to the gooseneck. The first end 320A of the diffuser base 320 mounts on the gooseneck so that the inner conduit of the gooseneck extends into the first end of the diffuser base 320 and into the inner cavity 320C of the diffuser base 320. The gooseneck (not shown) can be similar to any gooseneck well known in the art. The diffuser base 320 can be mounted on the gooseneck by any means well known in the art. In one embodiment, the inner surface of the wall 327 forming and surrounding the inner cavity 320C of the diffuser base 320 adjacent the first end 320A has first threads 320D and the diffuser base 320 is threadably connected to the gooseneck. In one embodiment, the inner surface of the wall 327 forming the inner cavity 320C has second threads 320E. In one embodiment, the second threads 320E are spaced apart from the first end 320A and the second end 320B of the diffuser base 320. In one embodiment, the outer surface of the diffuser base 320 adjacent the second end 320B is provided with third threads. In one embodiment, the diameter of the diffuser base 320 at the first end 320A is larger than the diameter of the diffuser base 320 at the second end 320B. However, it is understood that the shape of the diffuser base 320 can vary depending on the use of the end assembly 310.

The diffuser sleeve 321 is mounted adjacent the second end 320B of the diffuser base 320. The diffuser sleeve 321 has a first end 321A and a second end 321B with a wall 328 extending therebetween forming an inner chamber between the ends 321A and 321B. The wall 328 extends between the ends 321A and 321B along the longitudinal axis A"-A" of the diffuser sleeve 321. The wall 328 has an inner surface 328C and an outer surface 328D extending between the ends 321A and 321B with a length between the ends 321A and 321B extending essentially along the longitudinal axis A"-A" of the diffuser sleeve 321. The wall 328 of the diffuser sleeve 321 has a diffuser portion 328A spaced between the first and second ends 321A and 321B of the diffuser sleeve 321. In one embodiment, the diffuser portion 328A is adjacent the second end 321B of the diffuser sleeve 321. In one embodiment, the inner surface 328C of the wall 328 adjacent the first end 321A is provided with first threads 328E. In one embodiment, the inner surface 328C adjacent the second end 321B is provided with second threads 328F. In one embodiment, the diffuser portion 328A is spaced apart from the second end 321B of the diffuser sleeve 321 by the second threads 328F of the diffuser sleeve 321. In one embodiment, the inner surface 328C of the diffuser portion 328A of the wall 328 is tapered. In one embodiment, a thickness of the diffuser portion 328A of the wall 328 along the length of the diffuser sleeve 321 is constant. In one embodiment, the thickness of the diffuser portion 328A of the wall 328 varies along the length. In one embodiment, the inner chamber along the length of the diffuser portion 328A of the wall 328 has a cylindrical shape. In one embodiment, the diffuser portion 328A of the wall 328 is tapered such that the thickness of the diffuser portion 328A of the wall 328 decreases along the length of the diffuser portion 328A of the wall 328 from the first end 321A of the diffuser sleeve 321 toward the second end 321B of the diffuser sleeve 321. The diffuser portion 328A of the wall 328 has a least one hole 330. In one embodiment, the diffuser portion 328A of the wall 328 has a plurality of holes 330 spaced around the outer surface 328D of the wall 328. The holes 330 in the wall 328 are in fluid communication with the inner chamber of the diffuser sleeve 321. In one embodiment, the holes 330 are evenly spaced around the outer surface 328D of the wall 328. In one embodiment, the diffuser portion 328A of the wall 328 has a cylindrical shape along the length of the diffuser sleeve 321 and the holes 330 are spaced around a circumference of the wall 328 along a common plane perpendicular to the longitudinal axis A"-A" of the diffuser sleeve 321. In one embodiment, the diffuser portion 328A of the wall 328 has more than one hole 330 and different holes 330 are located at different positions along the wall 328 of the diffuser portion 328A of the diffuser sleeve 321 and are spaced around a circumference of the wall 328 such that the holes 330 are located in more than one plane perpendicular to the longitudinal axis A"-A" of the diffuser sleeve 321. In one embodiment, the holes 330 are all essentially identical having a similar size, shape and orientation. In one embodiment, the holes 330 have different sizes. In one embodiment, the holes 330 have different orientations. In one embodiment, the holes 330 have different shapes.

In one embodiment, the diffuser base 320 and the diffuser sleeve 321 are removeably connected together. In one embodiment, the diffuser base 320 and the diffuser sleeve 321 are connected together by the insert 340. In one embodiment, the diffuser base 320 and the diffuser sleeve 321 are a single piece. In one embodiment, the diffuser base 320 and the diffuser sleeve 321 are constructed of the same material. In one embodiment, the diffuser base 320 and the diffuser sleeve 321 are constructed of brass. In one embodiment, diffuser sleeve 321 is constructed of a material dissimilar to the material used to construct the insert 340 and the contact tip 332. In one embodiment, the diffuser base 320 is constructed of a material dissimilar to the material used to construct the insert 340 and the contact tip 332. In one embodiment, the diffuser base 320 and the diffuser sleeve 321 are not constructed of copper. In one embodiment, the diffuser base 320 is constructed of a poorly conductive or non-conductive material. In one embodiment, the diffuser base 320 is constructed of a material that is less conductive than the material or materials used to construct the insert 340 or the contact tip 332. In one embodiment, the diffuser base 320 is constructed of brass. In one embodiment, the diffuser base 320 is constructed of 360 half hard brass. In one embodiment, the diffuser base 320 is constructed of ceramic. In one embodiment, the diffuser base 320 is constructed of a high temperature polymer. In one embodiment, the diffuser base 320 is constructed of a ferrous material. In one embodiment, the diffuser base 320 is constructed of a non-ferrous material. In one embodiment, the diffuser sleeve 321 is constructed of a poorly conductive or non-conductive material. In one embodiment, the diffuser sleeve 321 is constructed of a material that is less conductive than the material or materials used to construct the insert 340 or the contact tip 332. In one embodiment, the diffuser sleeve 321 is constructed of brass. In one embodiment, the diffuser sleeve 321 is constructed of 360 half hard brass. In one embodiment, the diffuser sleeve 321 is constructed of ceramic. In one embodiment, the diffuser sleeve 321 is constructed of a high temperature polymer. In one embodiment, the diffuser sleeve 321 is constructed of a ferrous material. In one embodiment, the diffuser sleeve 321 is constructed of a non-ferrous material.

The insert 340 has a first end 340A and a second end 340B with a wall 342 extending therebetween surrounding and forming an inner passageway 346. The insert 340 can have a variety of shapes and sizes. The shape of the insert 340 can vary depending on the shape and size of the inner cavity 320C of the diffuser base 320 and the inner chamber of the diffuser sleeve 321 and the shape and size of the contact tip 332. The shape and size of the insert 340 can also vary depending on the specific use of the welding device 110. The wall 342 of the insert 340 has an inner surface 342C and an outer surface 342D extending between the ends 340A and 340B of the insert 340. The wall 342 has a length between the ends 340A and 340B extending along the longitudinal axis of the insert 340 which corresponds to the longitudinal axis A"-A" of the diffuser sleeve 321. In one embodiment, the outer surface 342D of the wall 342 of the insert 340 adjacent the first end 340A is provided with first threads 342E. In one embodiment, the outer surface 342D of the wall 342 of the insert 340 spaced between first threads 342E and the second end 340B of the insert 340 is provided with second threads 342F. In one embodiment, a thickness of the wall 342 along the length of the insert 340 is constant. The wall 342 of the insert 340 has a diffuser portion 342A spaced between the first and second ends 340A and 340B of the insert 340. In one embodiment, the thickness of the diffuser portion 342A of the wall 342 varies along the length of the diffuser portion 342A of the wall 342. In one embodiment, the diffuser portion 342A of the wall 342 is tapered such that the thickness of the wall 342 decreases along the length of diffuser portion 342A the wall 342 from the first end 340A toward the second end 340B of the insert 340. In one embodiment, the outer surface 342D of the diffuser portion 342A of the wall 342 is angled. In one embodiment, the diffuser portion 342A of the wall 342 is angled so that a size of the inner passageway 346 decreases along the length of the diffuser portion 342A from the first end 340A toward the second end 340B of the insert 340. The diffuser portion 342A of the wall 342 of the insert 340 has at least one hole 344 extending through the wall 342. The hole 344 is in fluid communication with the inner passageway 346 of the insert 340. In one embodiment, the diffuser portion 342A of the wall 342 has a plurality of holes 344 extending through the wall 342. In one embodiment, the diffuser portion 342A of the wall 342 has a cylindrical shape and the holes 344 are spaced apart around the outer surface 342D of the diffuser portion 342A of the wall 342. In one embodiment, the holes 344 in the diffuser portion 342A of the wall 342 of the insert 340 are essentially perpendicular to the longitudinal axis of the insert 340. In one embodiment, the holes 344 in the diffuser portion 342A of the wall 342 of the insert 340 are angled with respect to the longitudinal axis of the insert 340. In one embodiment, the holes 344 are evenly spaced around the diffuser portion 342A of the wall 342 of the insert 340. In one embodiment, the diffuser portion 342A of the wall 342 has a cylindrical shape along the length and the holes 344 are spaced around a circumference of the diffuser portion 342A of the wall 342 along a common plane perpendicular to the longitudinal axis of the insert 340. In one embodiment, the diffuser portion 342A of the wall 342 has more than one hole 344 and different holes 344 are located at different positions along the length of the wall 342 of the diffuser portion 342A and are spaced around a circumference of the diffuser portion 342A of the wall 342 such that the holes 344 are in more than one plane perpendicular to the longitudinal axis of the insert 340. In one embodiment, the holes 344 are essentially identical having a similar size, shape and orientation. In one embodiment, the holes 344 have different sizes. In one embodiment, the holes 344 have different orientations. In one embodiment, the holes 344 have different shapes.

The inner passageway 346 of the insert 340 has a first section 346A adjacent the first end 340A of the insert 340, a second section 346C adjacent the second end 340B of the insert 340, and a diffuser section 346B spaced between the first and second sections 346A and 346C. The first section 346A of the inner passageway 346 of the insert 340 is directly adjacent and in direct communication with the passageway of the gooseneck. The shape and size of the first section 346A of the inner passageway 346 can vary depending on the shape and size of the diffuser base 320 and the passageway of the gooseneck. In one embodiment, the first section 346A of the inner passageway 346 of the insert 340 has a cylindrical shape. In one embodiment, the diameter of the first section 346A of the inner passageway 346 is greater than the diameter of the diffuser section 346B of the inner passageway 346. The diffuser section 346B of the inner passageway 346 is adjacent the diffuser portion 342A of the wall 342 of the insert 340. In one embodiment, the diffuser section 346B is tapered in a direction toward the second section 346C of the inner passageway 346 of the insert 340. The diameter of the second section 346C of the inner passageway 346 of the insert 340 is greater than a diameter of the electrode 116 so that the electrode 116 can extend through the second section 346C of the inner passageway 346 of the insert 340 and into the center bore 334 of the contact tip 332. The second section 346C of the inner passageway 346 of the insert 340 at the second end 340B is coaxial with the center bore 334 of the contact tip 332 to enable the electrode 116 to move smoothly through the inner passageway 346 of the insert 340 into the center bore 334 of the contact tip 332. In one embodiment, an outer diameter of the second end 340B of the insert 340 is essentially equal to an outer diameter of the first end 340A of the insert 340. In one embodiment, the second end 340B of the insert 340 has an indention 340C with an inner surface. In one embodiment, the indention 340C is radiused having a radiused inner surface. In one embodiment, the shape of the indention 340C in the second end 340B of the insert 340 is essentially the exact opposite of the shape of the end surface 332D of the first end 332A of the contact tip 332 so that the first end 332A of the contact tip 332 sits securely into the indention 340C and the outer end surface 332D of the contact tip 332 fully contacts the radiused or curved inner surface of the indention 340C. In one embodiment, the insert 340 is constructed of a conductive material. In one embodiment, the insert 340 is constructed of copper. In one embodiment, the insert 340 is constructed of tempered copper. In one embodiment, the insert 340 is constructed of C110 copper.

In one embodiment, the contact tip 332 of the third embodiment is similar to the contact tip 32 of the first embodiment. The contact tip 332 has a first end 332A and a second end 332B with a center bore 334 extending the complete distance therebetween. The contact tip 332 is connected at the first end 332A to the second end 321B of the diffuser sleeve 321. The contact tip 332 can be secured to the diffuser sleeve 321 by any means well known in the art. In one embodiment, the contact tip 332 extends into the inner chamber of the diffuser sleeve 321 at the second end 321B of the diffuser sleeve 321. In one embodiment, the first end 332A of the contact tip 332 has threads which threadably mate with the second threads 328F of the diffuser sleeve 321 and the contact tip 332 is threadably secured to the diffuser sleeve 321. The contact tip 332 is secured in the diffuser sleeve 321 so that the first end 332A of the contact tip 332 is in contact with the second end 340B of the insert 340 so that the radiused outer end surface 332D of the contact tip 332 is in tight contact with the radiused inner surface of the indention 340C in the second end 340B of the insert 340. The contact tip 332 is secured in contact with the insert 340 by the diffuser sleeve 321. In one embodiment, the contact tip 332 is constructed of conductive material. In one embodiment, the contact tip 332 is constructed of copper. In one embodiment, the contact tip 332 is constructed of tempered copper. In one embodiment, the contact tip 332 is constructed of deoxidized high phosphorous copper 122 (DHP 122).

In one embodiment, a nozzle insulator 335 having a first end 335A and second end 335B with a center bore extending therebetween is mounted over the diffuser base 320 and the diffuser sleeve 321. In one embodiment, the nozzle insulator 335 extends over both the second end 320B of the diffuser base 320 and the first end 321A of the diffuser sleeve 321 and covers the intersection of the diffuser base 320 and the diffuser sleeve 321. In one embodiment, the center bore of the nozzle insulator 335 is provided with threads and the nozzle insulator 335 is threadably mounted on the diffuser base 320. In one embodiment, the nozzle insulator 335 is constructed of a non-conductive material.

The nozzle 336 is similar to nozzles well known in the art. The nozzle 336 has a first end and an open second end with a gas channel 338 extending therebetween. The first end of the nozzle 336 is connected to second end of the nozzle insulator 335. In one embodiment, the nozzle 336 is threadably secured on the nozzle insulator 335. However it is understood that the nozzle 336 can be secured on the nozzle insulator 335 by any means well known in the art. When the nozzle 336 is secured on the nozzle insulator 335, the nozzle 336 extends outward from the first end along the contact tip 332 essentially along the longitudinal axis A"-A" of the diffuser sleeve 321 toward the second end 332B of the contact tip 332 so that the diffuser sleeve 321 is in the gas channel 338 of the nozzle 336 and the holes 330 in the diffuser portion 328 of the wall 328 of the diffuser sleeve 321 are in fluid communication with the gas channel 338 of the nozzle 336. The nozzle 336 extends along the contact tip 332 so that the contact tip 332 is in the gas channel 338. In one embodiment, the second end of the nozzle 336 extends beyond the second end 332B of the contact tip 332. In one embodiment, the second end of the nozzle 336 is essentially even with the second end 332B of the contact tip 332. In one embodiment, the second end 332B of the contact tip 332 extends beyond the second end of the nozzle 336. In one embodiment, the second end of the gas channel 338 is tapered inward toward the contact tip 332.

In the first embodiment of the present invention, the end assembly 10 is assembled so that the second end 12B of the gooseneck 12 is securely held in the inner cavity 22 of the diffuser sleeve 20 at the first end 20A and the contact tip 32 is securely held in the inner cavity 22 of the diffuser sleeve 20 at the second end 20B with the insert 40 spaced therebetween. The second end 12B of the gooseneck 12, the diffuser sleeve 20, the insert 40 and the contact tip 32, when secured together share a common axis forming the longitudinal axis of the end assembly 10 which is substantially the longitudinal axis A-A of the diffuser sleeve 20. The diffuser sleeve 20 is connected to the second end 12B of the gooseneck 12 by any means well known in the art. In one embodiment, the second end 12B of the gooseneck 12 is force fit into the inner cavity 22 at the first end 20A of the diffuser sleeve 20. The contact tip 32 is connected to the second end 20B of the diffuser sleeve 20 by any of means well known in the art. In one embodiment, the inner cavity 22 of the diffuser sleeve 20 at the second end 22B has threads 31 and the first end 32A of the contact tip 32 has threads 32C and the contact tip 32 is threadably secured in the inner cavity 22 of the diffuser sleeve 20. In one embodiment, the threads 31 and 32C are buttress threads. In one embodiment, the buttress threads 31 are created in the inner cavity 22 of the diffuser sleeve 20 by tapping the diffuser sleeve 20 from the first end 20A prior to positioning of the insert 40 in the inner cavity 22 of the diffuser sleeve 20. In one embodiment, there are four (4) buttress threads and the contact tip 32 is rotated four (4) times to secure or remove the contact tip 32 from the diffuser sleeve 20. The use of buttress threads enables less turns of the contact tip 32 to secure the contact tip 32 in the diffuser sleeve 20. The insert 40 is positioned and secured in the inner cavity of the diffuser sleeve 20 spaced between the second end 12B of the gooseneck 12 and the first end 32A of the contact tip 32. The insert 40 is positioned in the inner cavity 22 of the diffuser sleeve 20 with the wall 42 of the insert 40 axially adjacent the wall 28 of the diffuser sleeve 20. The insert 40 can be secured in the inner cavity 22 by any means well known in the art. In one embodiment, the insert 40 is press fit in the inner cavity 22 of the diffuser sleeve 20. The insert 40 is in contact with the second end 12B of the gooseneck 12 and the first end 32A of the contact tip 32. In one embodiment, where the contact tip 32 has a radiused end surface 32D and the insert 40 has the indention 40C with a radiused inner surface 40D, the diffuser sleeve 20 secures the contact tip 32 in contact with the insert 40 so that the radiused end surface 32D of the contact tip 32 extends into the indention 40C in the second end 40B of the insert 40 and contacts the radiused inner surface 40D of the insert 40 to increase the surface contact area between the insert 40 and the contact tip 32. In one embodiment, the shape of the indention 40C in the second end 40B of the insert 40 is essentially the exact opposite of the shape of the end surface 32D of the first end 32A of the contact tip 32 so that the first end 32A of the contact tip 32 fits securely into the indention 40C in the second end 40B of the insert 40 and the radiused outer end surface 32D buts the inner surface 40D of the indention 40C. The first end 36A of the nozzle 36 is connected to the diffuser sleeve 20 by any means well known in the art. The nozzle 36 is connected to the first portion of the diffuser sleeve 20 and extends outward towards the second end 32B of the contact tip 32. In one embodiment, the second end 36B of the nozzle 36 is essentially even with the second end 32B of the contact tip 32. However, it is understood that the second end 36B of the nozzle 36 can extend beyond the second end 32B of the contact tip 32 or the second end 32B of the contact tip 32 can extend beyond the second end 36B of the nozzle 36.

In one embodiment, the second end 12B of the gooseneck 12 is constructed of a conductive material, the insert 40 is constructed of a conductive material, the contact tip 32 is constructed of a conductive material and the diffuser sleeve 20 is constructed of a poorly conductive or non-conductive material or of a material that is less conductive than the material or materials used to construct the insert 40 or the contact tip 32. In one embodiment, the second end 12B of the gooseneck 12 is constructed of copper, the insert 40 is constructed of copper, the contact tip 32 is constructed of copper and the diffuser sleeve 20 is constructed of brass. The diffuser sleeve 20 ensures a secure and tight fit between the gooseneck 12, the insert 40 and the contact tip 32 and ensures constant contact between the second end 12B of the gooseneck 12, the insert 40 and the contact tip 32 during use of the welding device 110. In one embodiment, the second end 12B of the gooseneck 12 is formed by the inner conduit 16, and the inner conduit 16 is constructed of a conductive material and the inner conduit 16 is in contact with the insert 40. In one embodiment, the second end 12B of the gooseneck 12 is formed by the inner conduit 16, and the inner conduit 16 is constructed of copper and the inner conduit 16 is in contact with the insert 40.

In the second embodiment where the diffuser 240 is connected to the second end 212B of the gooseneck 212, the second end 212B of the gooseneck 212 having the diffuser 240 is inserted into the inner cavity 222 of the diffuser sleeve 220 at the first end 220A and moved into the inner cavity 222 until the wall 242 of the diffuser 240 is axially adjacent the wall 228 of the diffuser sleeve 220. In this embodiment, the diffuser sleeve 220 can be secured on the second end 212B of the gooseneck 212 by any means well known in the art. In one embodiment, the inner cavity 222 at the first end 220A of the diffuser sleeve 220 has threads and second end 212B of the gooseneck 220 has threads and the threads of the gooseneck 212 threadably mate with the threads of the diffuser sleeve 220 to securely hold the gooseneck in the diffuser sleeve. The contact tip 232 is inserted into the inner cavity 222 of the diffuser sleeve 220 from the open second end 220B of the diffuser sleeve 220. The contact tip 232 can be secured in the diffuser sleeve 220 by any means well known in the art. In one embodiment, the inner cavity 222 at the second end 220B of the diffuser sleeve 220 has threads and first end 232A of the contact tip 232 has threads and the threads of the contact tip 232 threadably mate with the threads of the diffuser sleeve 220 to securely hold the contact tip in the diffuser sleeve 220. In one embodiment, the diffuser 240 is constructed of a conductive material, the contact tip 232 is constructed of a conductive material and the diffuser sleeve 220 is constructed of a poorly conductive or non-conductive material or of a material that is less conductive than the material or materials used to construct the contact tip 232 or the diffuser 240. In one embodiment, the diffuser 240 is constructed of copper, the contact tip 232 is constructed of copper and the diffuser sleeve 220 is constructed of brass. The diffuser sleeve 220 ensures a secure and tight fit between the gooseneck 212 and the contact tip 232 and enables constant contact between the diffuser 240 of the gooseneck 212 and the contact tip 232 during use of the welding device 110. In one embodiment, the diffuser 240 is formed in the end of the inner conduit 216 and the inner conduit 216 is constructed of a conductive material and the inner conduit 216 is in contact with the contact tip 232. In one embodiment, the diffuser 240 is formed in the end of the inner conduit 216 and the inner conduit 216 is constructed of conductive material and the inner conduit 216 is in contact with the contact tip 232. In one embodiment, the diffuser 240 is formed in the end of the inner conduit 216 and the inner conduit 216 is constructed of copper and the inner conduit 216 is in contact with the contact tip 232.

To construct the end assembly 310 of the third embodiment, the second end 340B of the insert 340 is inserted into the inner cavity 320C of the diffuser base 320 through the first end 320A of the diffuser base 320. The insert 340 is inserted into the diffuser base 320 until the second end 340B of the insert 340 extends beyond the second end 320B of the diffuser base 320 and the first end 340A of the insert 340 is completely within the inner cavity 320C of the diffuser base 320. In one embodiment, the first end 340A of the insert 340 does not extend completely into the inner cavity 320C of the diffuser base 320 and the first end 340A of the insert 340 extends beyond the first end 320A of the diffuser base 320 in a direction opposite the second end 320B of the diffuser base 320. In this embodiment, the gooseneck is mounted on the first end 340A of the insert 340. The insert 340 can be secured in the inner cavity 320C of the diffuser base 320 by any means well known in the art. In one embodiment, the first threads 342E on the first end 340A of the insert 340 mate with the second threads 320E of the diffuser base 320 and the insert 340 is threadably secured in the diffuser base 320. The diffuser sleeve 321 is positioned on the second end 340B of the insert 340 so that the second end 340B of the insert 340 moves into the inner chamber of the diffuser sleeve 321 through the first end 321A of the diffuser sleeve 321. The diffuser sleeve 321 is then secured to the insert 340. The insert 340 can be secured in the inner chamber of the diffuser sleeve 321 by any means well known in the art. In one embodiment, the first threads 328E on the first end 321A of the diffuser sleeve 321 threadably mates with the second threads 342F on the outer surface 342D of the wall 342 of the insert 340 to threadably secure the insert 340 in the inner chamber of the diffuser sleeve 321. In one embodiment, the insert 340 extends beyond the second end 320B of the diffuser base 320 to almost the second end 321B of the diffuser end sleeve 321. In one embodiment, the insert 340 does not extend beyond the second end 321B of the diffuser sleeve 321.

When the insert 340 is secured in the inner chamber of the diffuser sleeve 321, the diffuser portion 328A of the wall 328 of the diffuser sleeve 321 is axially adjacent the diffuser portion 342A of the wall 342 of the insert 340. The diffuser portion 328A of the wall 328 of the diffuser sleeve 321 is spaced apart from the diffuser portion 342A of the wall 342 of the insert 340 forming a chamber 350 positioned between the diffuser portion 328A of the wall 328 of the diffuser sleeve 321 and the diffuser portion 342A of the wall 342 of the insert 340. The outer surface 342D of the diffuser portion 342A of the wall 342 of the insert 340 is spaced apart from the inner surface 328C of the diffuser portion 328A of the wall 328 of the diffuser sleeve 321 forming the chamber 350. In one embodiment, the outer surface 342D of the diffuser portion 342A of the wall 342 of the insert 340 is angled along an axial length of the insert 340 so that the chamber 350 is tapered along the axis A"-A" and along the length of the chamber 350. In one embodiment, the length of the diffuser portion 342A of the wall 342 of the insert 340 is varied to change the length of the chamber 350. In one embodiment, the length of the diffuser portion 328A of the wall 328 of the diffuser sleeve 321 is varied to change the length of the chamber 350. In one embodiment, the shape of the outer surface 342D of the diffuser portion 342A of the wall 342 of the insert 340 is varied to change or adjust the shape and size of the chamber 350. In one embodiment, the inner surface 328C of the diffuser portion 328A of the wall 328 of the diffuser sleeve 321 is varied to change a size and shape of the chamber 350. In one embodiment, the chamber 350 extends along the longitudinal axis A"-A" of the diffuser sleeve 321 and the diameter of the chamber 350 adjacent the first end 340A of the insert 340 is less than the diameter of the chamber 350 adjacent the second end 340B of the insert 340. The holes 344 in the diffuser portion 342A of the wall 342 of the insert 340 and the holes 330 in the diffuser portion 328A of the wall 328 of the diffuser sleeve 321 are in fluid communication with the chamber 350. In one embodiment, the insert 340 is positioned in the diffuser sleeve 321 so that the holes 344 in the diffuser portion 342A of the wall 342 of the insert 340 are not axially aligned or are axially misaligned or axially offset with the holes 330 in the diffuser portion 328A of the wall 328 of the diffuser sleeve 321 so that the holes 344 in the diffuser portion 342A of the wall 342 of the insert 340 are axially spaced apart from the holes 330 in the diffuser portion 328A of the wall 328 of the diffuser sleeve 321. In one embodiment, when the insert 340 is positioned in the diffuser sleeve 321, the holes 344 in the diffuser portion 342A of the wall 342 of the insert 340 and the holes 330 in the diffuser portion 328A of the wall 328 of the diffuser sleeve 321 are not in the same plane perpendicular to the longitudinal axis A"-A" of the end assembly 310. In one embodiment, when the insert 340 is positioned in the diffuser sleeve 321, the holes 344 in the diffuser portion 342A of the wall 342 of the insert 340 are axially positioned between the first end 321A of the diffuser sleeve 321 and the holes 330 in the diffuser portion 328A of the wall 328 of the diffuser sleeve 321. In another embodiment, when the insert 340 is positioned in the diffuser sleeve 321, the holes 330 in the diffuser portion 328A of the wall 328 of the diffuser sleeve 321 are axially positioned between the first end 321A of the diffuser sleeve 321 and the holes 344 in the diffuser portion 342A of the wall 342 of the insert 340. In one embodiment, the diameter of the holes 330 in the diffuser portion 328A of the wall 328 of the diffuser sleeve 321 is greater than the diameter of the holes 344 in the diffuser portion 342A of the wall 342 of the insert 340. In one embodiment, the diameter of the holes 330 in the diffuser portion of the wall 328 of the diffuser sleeve 321 is less than the diameter of the holes 344 in the diffuser portion 342A of the wall 342 of the insert 340. In one embodiment, the diameter of the holes 330 in the diffuser portion 328A of the wall 328 of the diffuser sleeve 321 is essentially equal to the diameter of the holes 344 in the diffuser portion 342A of the wall 342 of the insert 340. In one embodiment, the number of holes 330 in the diffuser portion 328A of the wall 328 of the diffuser sleeve 321 is equal to the number of holes 344 in the diffuser portion 342A of the wall 342 of the insert 340. In one embodiment, the number of holes 330 in the diffuser portion 328A of the wall 328 of the diffuser sleeve 321 is less than the number of holes 344 in the diffuser portion 342A of the wall 342 of the insert 340. In one embodiment, the number of holes 330 diffuser portion 328A in the wall 328 of the diffuser sleeve 321 is greater than the number of holes 344 in the diffuser portion 342A of the wall 342 of the insert 340. It is understood that the number and diameter of the holes 330 in the diffuser portion 328A of the wall 328 of the diffuser sleeve 321 and the number and diameter of the holes 344 in the diffuser portion 342A of the wall 342 of the insert 340 can vary depending on the use of the end assembly 310, the type of gas used during welding, the material used to construct the contact tip 332, the material used to construct the insert 340 and the amount of current used during welding as well as other variables.

Once the insert 340 is secured in the diffuser sleeve 321, the contact tip 332 is connected to the second end 321B of the diffuser sleeve 321. The contact tip 332 is secured in the diffuser sleeve 321 so that the outer end surface 332D of the tapered or radiused first end 332A of the contact tip 332 is securely in contact with the inner surface of the indention 340C in the second end 340B of the insert 340 and so that the center bore 334 of the contact tip 332 is aligned with the second section 346C of the inner passageway 346 of the insert 340. Once the contact tip 332 is secured in the inner chamber of the diffuser sleeve 321, the nozzle 336 can be secured onto the diffuser sleeve 321. The end assembly 310 is mounted on the second end of the gooseneck so that the inner conduit of the gooseneck is in contact with the first end 340A of the insert 340.

Figure 12:
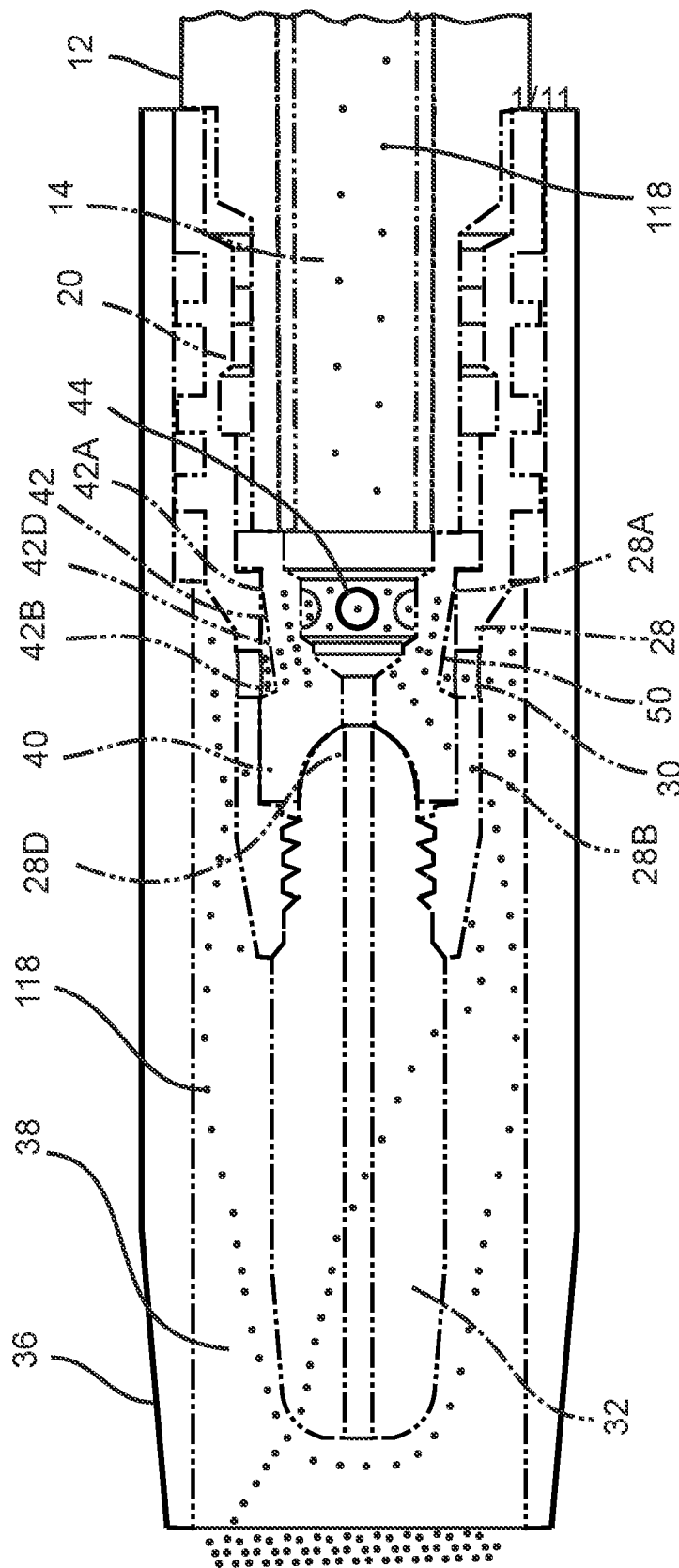
FIG. 12 is a cross section view of one embodiment of an end assembly 10 showing the flow of gas 118.

The end assembly 10 of the present invention is secured to the welding device 110 for use in a welding system 100. The welding system 100 is activated such that the electrode 116 moves from the electrode supply 104 through the passageway of the gooseneck 12 through the inner passageway 46 of the insert 40 and through the center bore 34 of the contact tip 32 toward the workpiece 120. In the second embodiment, the electrode 116 moves through the passageway 214 of the gooseneck 212 through the diffuser 240 and through the center bore 234 of the contact tip 232 toward the workpiece 120. In the third embodiment, the electrode 116 moves through the inner cavity 320C of the diffuser base 320, through the inner passageway 346 of the insert 340 and through the center bore 334 of the contact tip 332 toward the workpiece 120. In one embodiment, the electrode 116 is a weld wire similar to weld wires well known in the art. As the electrode 116 moves through the end assembly 10, the gas 118 flows from the gas supply 102 through the passageway 14 of the gooseneck 12 to the inner passageway 46 of the insert 40. The gas 118 flows from the first section 46A of the inner passageway 46 into the diffuser section 46B of the inner passageway 46 of the insert 40. The gas 118 exits the diffuser section 46B and flows out the hole or holes 44 in the wall 42 of the insert 40 into the chamber 50. In the second embodiment, the gas 118 flows from the gas supply 102 through the passageway 214 of the gooseneck 212 into the inner passageway 246 of the diffuser 240 and exits through the inner passageway 246 through the hole or holes 244 in the wall 242 of the diffuser 240 into the chamber 250. In the third embodiment, the gas 118 flows from the gas supply 102 through the passageway of the gooseneck into the inner cavity 320C of the diffuser base 320 and into the inner passageway 346 of the insert 340. The gas 118 flows from the first section 346A of the inner passageway 346 into the diffuser section 346B of the inner passageway 346 of the insert 340. The gas exits the inner passageway 346 through the hole or holes 344 in the diffuser section 342A of the wall 342 of the insert 340 and into the chamber 350. The gas 118 is trapped or temporarily held in the chamber 50, 250 or 350 before exiting the chamber 50, 250 or 350 through the hole or holes 30, 230, 330 in the wall 28, 228 or 328 of the diffuser sleeve 20 or 220 or diffuser sleeve 321 and into the gas channel 38 or 238 of the nozzle 36, 236 or 236. The gas 118 flows along the gas channel 38 or 238 of the nozzle 36, 236 or 336 to the open, second end 36B or 236B of the nozzle 36, 236 or 336 and around electrode 116 and the weld puddle on the workpiece 120. The size and the shape of the chamber 50, 250 or 350, the positioning, the number and the diameter of the hole or holes 44 in the wall 42 of the insert 40, or in the second embodiment the hole or holes 244 in the wall 242 of the diffuser 240, or in the third embodiment the hole or holes 344 in the diffuser portion 342A of the wall 342 of the insert 340 and the positioning, the number and the diameter of the hole or holes 30, 230 or 330 in the wall 28, 228 or 328 of the diffuser sleeve 20, 220 or 321 can be adjusted or changed to control the movement of the gas 118 trapped in the chamber 50, 250 or 350 and the flow of gas 118 exiting the chamber 50, 250 or 350. In one embodiment, the size and shape of the chamber 50, 250, or 350, the positioning, the number and the diameter of the hole or holes 44 in the wall 42 of the insert 40, or in the second embodiment the hole or holes 244 in the wall 242 of the diffuser 240, or in the third embodiment the hole or holes 344 in the diffuser portion 342A of the wall 342 of the insert 340 and the positioning, the number and the diameter of the hole or holes 30, 230 or 330 in the wall 28 or 228 of the diffuser sleeve 20 or 220 or diffuser portion 328A of the wall 328 of the diffuser sleeve 321 are adjusted or changed to control the velocity of the gas 118 in the chamber 50, 250 or 350. In one embodiment, the size and shape of the chamber 50, 250 or 350, the positioning, the number and the diameter of the hole or holes 44 in the wall 42 of the insert 40, or in the second embodiment the hole or holes 244 in the wall 242 of the diffuser 240, or in the third embodiment the hole or holes 344 in the diffuser portion 342A of the wall 342 of the insert 340 and the positioning, the number and the diameter of the hole or holes 30 or 230 in the wall 28 or 228 of the diffuser sleeve 20 or 220 or in the diffuser portion 328A of the wall 328 of the diffuser sleeve 321 are adjusted or changed to control the velocity of the gas 118 exiting the chamber 50, 250 or 350. In one embodiment, increasing a length of the chamber 50, 250 or 350 increases the velocity of the gas 118 held in the chamber 50, 250 or 350. In one embodiment, the chamber 50, 250 or 350 is tapered along the length so that a size or diameter of the chamber 50, 250 or 350 adjacent the first end 20A or 220A of the diffuser sleeve 20 or 220 or first end 321A of the diffuser sleeve 321 is smaller or less than the size or diameter of the chamber 50, 250 or 350 adjacent the second end 20B or 220B of the diffuser sleeve 20 or 220 or second end 321B of the diffuser sleeve 321. By controlling the movement of the gas 118 trapped in the chamber 50, 250 or 350 and by controlling the flow of gas 118 exiting the chamber 50, 250 or 350 into the gas channel 38, 238 or 338 of the nozzle 36, 236 or 336, the flow of gas 118 around the contact tip 32, 232 or 332 and exiting the open, second end 36B or 236B of the nozzle 36, 236 or 336 is controlled. In one embodiment, the velocity of the gas 118 exiting the chamber 50, 250 or 350 into the gas channel 38, 238 or 338 of the nozzle 36, 236 or 336 is greater than the velocity of the gas 118 entering the chamber 50, 250 or 350. By trapping or holding the gas 118 in the chamber 50, 250 or 350 and controlling the movement of the gas 118 in the chamber 50, 250 or 350, the flow of gas 118 through the gas channel 38, 238 or 338 of the nozzle 36, 236 or 336 is less turbulent which results in less turbulence in the flow of gas 118 exiting the second end 36B or 236B of the nozzle 36, 236 or 336 which results in a less turbulence and a more controlled flow of gas 118 around the weld puddle (FIG. 12). Controlling the flow of gas 118 around the weld puddle produces a more controlled atmosphere around the weld puddle which reduces the introduction of contaminants into the flow of gas 118 and into the weld puddle which produces a better weld. The flow of gas 118 in the end assembly 10, 210 or 310 is controlled such that the flow of gas 118 is evenly distributed around the contact tip 32, 232 or 332 as the gas 118 moves through the gas channel 38, 238 or 338 of the nozzle 36, 236 or 336 which allows for an even distribution of gas 118 out the second end 36B or 236B of the nozzle 36, 236 or 336 and around the electrode 116 and the weld puddle. Controlling the flow of gas 118 also reduces the amount of gas 118 used during welding. In one embodiment, the second end 32B, 232B or 332B of the contact tip 32, 232 or 332 is rounded which results in less disturbance of the flow of gas 118 as it exits the second end 36B or 236B of the nozzle 36, 236 or 336 which results in less turbulence and more controlled flow of gas 118 around the weld puddle. Trapping or holding the gas 118 in the chamber 50, 250 or 350 around the insert 40 or around the diffuser 240 or the insert 340, also acts to cool the insert 40, diffuser 240 or insert 340 and the contact tip 32, 232 or 332. Cooling of the contact tip 32, 232 or 332 slows the annealing of the contact tip 32, 232 or 332 which results in a longer useful life for the contact tip 32, 232 or 332.

In one embodiment, the second end 12B of the gooseneck 12, the insert 40 and the contact tip 32 are constructed of a conductive material and the diffuser sleeve 20 is constructed of a poorly conductive or non-conductive material or of a material less conductive than the material or materials used to construct the insert 40 or the contact tip 32. In one embodiment, the second end 12B of the gooseneck 12, the insert 40 and the contact tip 32 are constructed of copper and the diffuser sleeve 20 is constructed of a poorly conductive or non-conductive material or a material that is less conductive than copper. In one embodiment the second end 12B of the gooseneck 12, the insert 40 and the contact tip 32 are constructed of copper and the diffuser sleeve 20 is constructed of brass. The diffuser sleeve 20 securely holds the contact tip 32 in contact with the insert 40 and the insert 40 in contact with the second end 12B of the gooseneck 12 during use of the welding device 110. The diffuser sleeve 20 securely holds the contact tip 32, insert 40 and second end 12B of the gooseneck 12 in position which allows for good conductivity between second end 12B of the gooseneck 12, the insert 40 and the contact tip 32. The gas 118 trapped in the chamber 50 around the wall 42 of the insert 40 cools the insert 40 which reduces the temperature of the insert 40 and the contact tip 32 and prevents the insert 40 and contact tip 32 from fusing together. The cooling of the insert 40 by the gas 118 trapped in the chamber 50 also pulls heat away from the contact tip 32 which is in contact with the insert 40 which reduces the heat of the contact tip 32 during use and extends the life of the contact tip 32.

In one embodiment of the second embodiment, the diffuser 240 and the contact tip 232 are constructed of a conductive material and the diffuser sleeve 220 is constructed of a poorly conductive or non-conductive material or a material that is less conductive than the material or materials used to construct the diffuser 240 or the contact tip 232. In one embodiment of the second embodiment, the diffuser 240 and the contact tip 232 are constructed of copper and the diffuser sleeve 220 is constructed of a poorly conductive or non-conductive material or of a material less conductive than copper. In one embodiment of the second embodiment, the diffuser 240 and the contact tip 232 are constructed of copper and the diffuser sleeve 220 is constructed of a brass. The diffuser sleeve 220 securely holds the contact tip 232 in contact with the diffuser 240 allowing for good conductivity between diffuser 240 and the contact tip 232 during use of the welding device 110. The gas 118 trapped in the chamber 250 acts to cool the diffuser 240 which reduces the heat of the diffuser 240 and prevents the diffuser 240 and the contact tip 232 from fusing together. The gas 118 trapped in the chamber 250 cools the diffuser 240 and pulls heat away from the contact tip 232 which is in contact with the diffuser 240 which reduces the heat of the contact tip 232 during use and extends the life of the contact tip 232.

In one embodiment of the third embodiment, the inner conduit of the gooseneck, the insert 340 and the contact tip 332 are constructed of a conductive material and the diffuser sleeve 321 and the diffuser base 320 are constructed of a poorly conductive or non-conductive material or a material less conductive than the material or materials used to construct the insert 340 or the contact tip 332. In one embodiment, the inner conduit of the gooseneck, the insert 340 and the contact tip 332 are constructed of copper and the diffuser sleeve 321 and diffuser base 320 are constructed of a poorly conductive, less conductive or non-conductive material. In one embodiment, the diffuser sleeve 321 and the diffuser base 320 are constructed as a unitary piece. In one embodiment the inner conduit of the gooseneck, the insert 340 and the contact tip 332 are constructed of copper and the diffuser sleeve 321 and the diffuser base 320 are constructed of brass. The diffuser sleeve 321 securely holds the contact tip 332 in contact with the insert 340 and the diffuser base 320 securely holds the insert 340 in contact with the second end of the gooseneck during use of the welding device 110. The diffuser sleeve 321 and the diffuser base 320 securely hold the contact tip 332, insert 340 and second end of the gooseneck in position which allows for good conductivity between second end of the gooseneck, the insert 340 and the contact tip 332. The gas 118 trapped in the chamber 350 around the diffuser portion 342A of the wall 342 of the insert 340 cools the insert 340 which reduces the temperature of the insert 340 and the contact tip 332 and prevents the insert 340 and contact tip 332 from fusing together. The cooling of the insert 340 by the gas 118 trapped in the chamber 350 also pulls heat away from the contact tip 332 which is in contact with the insert 340 which reduces the heat of the contact tip 332 during use and extends the life of the contact tip 332.

Figure 3:
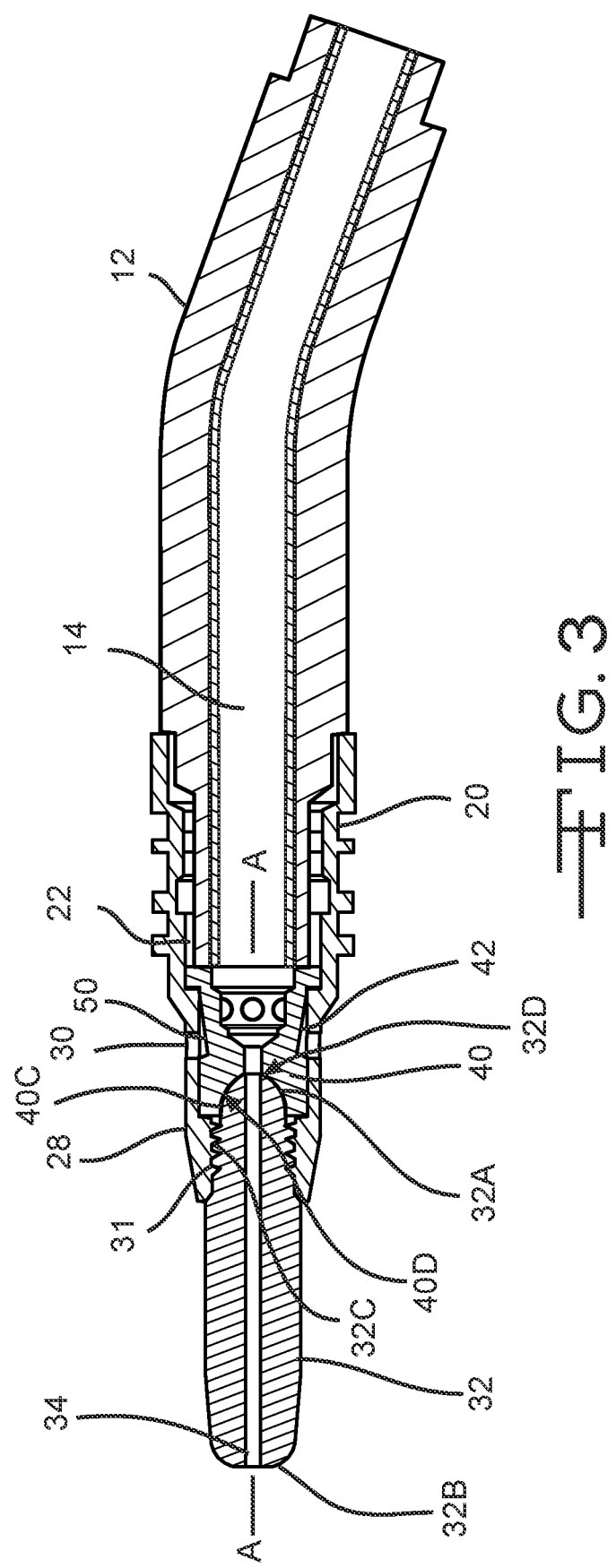
FIG. 3 is a cross section view of the end assembly 10 of FIG. 2 along the line 3-3 showing the chamber 50 between the diffuser sleeve 20 and insert 40.
Figure 4:
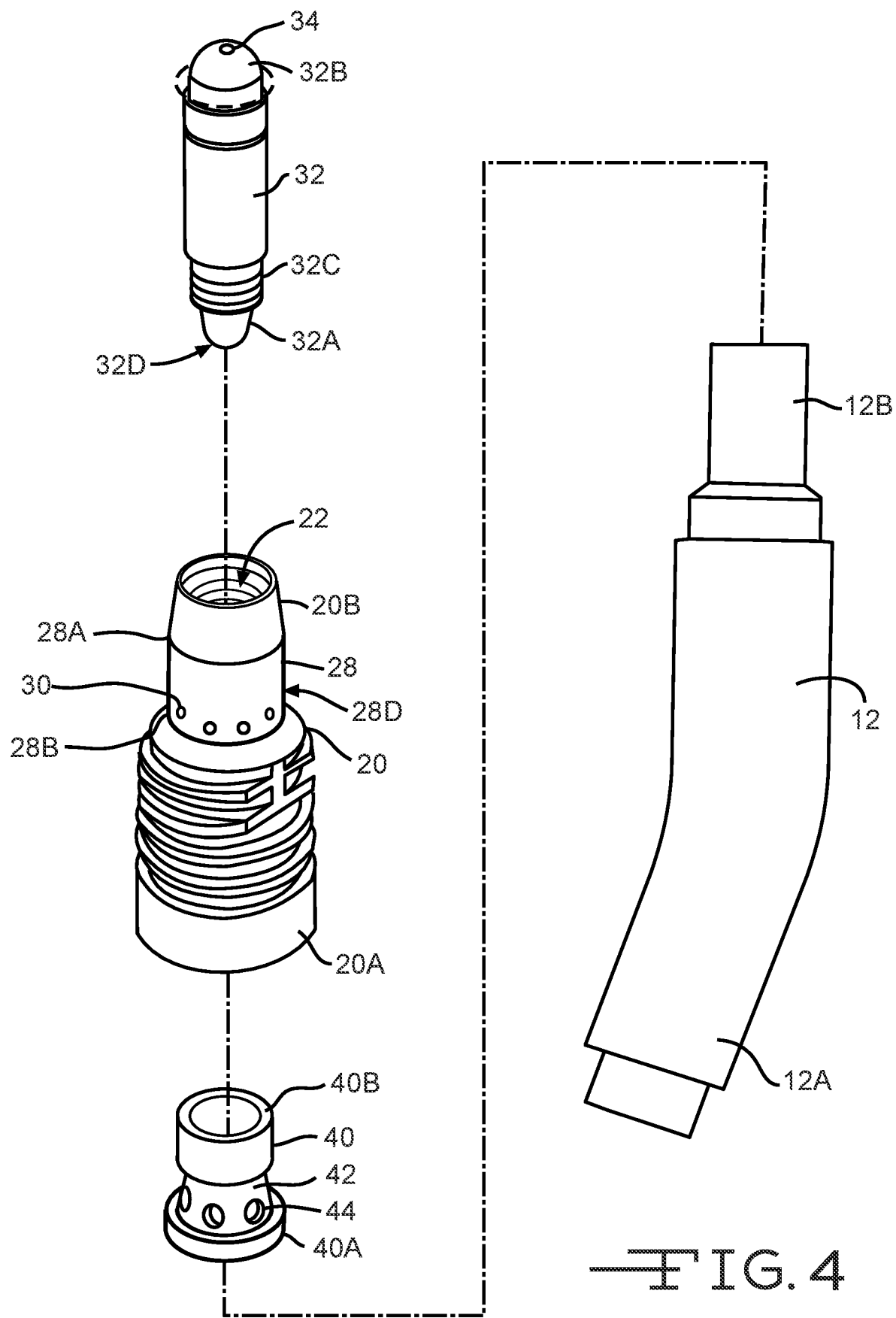
FIG. 4 is a exploded view of the end assembly 10 of FIG. 2.

Increasing the contact area between the contact tip 32, 232 or 332 and the insert 40, or the diffuser 240 or insert 340 increases the cooling effect of the trapped gas 118 on the contact tip 32, 232 or 332 through the insert 40, the diffuser 240 or the insert 340. In one embodiment where the contact tip 32 or 332 has a radiused end surface 32D or 332D and the insert 40 or insert 340 has the indention 40C or 340C with a radiused inner surface 40D, the diffuser sleeve 20 or diffuser sleeve 321 secures the contact tip 32 or 332 in contact with the insert 40 or insert 340 so that the radiused end surface 32D or 332D of the contact tip 32 or 332 extends into the indention 40C or 340C in the second end 40B or 340B of the insert 40 or insert 340 and contacts the radiused inner surface 40D of the insert 40 or insert 340 to increase the area of surface contact between the insert 40 or insert 340 and the contact tip 32 or 332 (FIG. 3). In the second embodiment where the diffuser 240 extends into the indention 232C in the first end 232A of the contact tip 232 such that the end surface of the diffuser 240 is in contact with the inner surface 232D of the indention 232C of the contact tip 232, the increased surface contact between the diffuser 240 and the contact tip 232 assists in moving the heat away from the contact tip 232 through the diffuser 240 as the gas 118 trapped in the chamber 250 cools the diffuser 240 which prevents the contact tip 232 from fusing with the diffuser 240 (FIG. 11).

In the embodiments where the second end 12B of the gooseneck 12, the insert 40 or insert 340 and the contact tip 32 or 332 are constructed of a conductive material with the gooseneck 12, the insert 40 or insert 340 and the contact tip 32 or 332 securely held together in constant contact by the diffuser sleeve 20 or 321 constructed of a poorly conductive or non-conductive material or less conductive material, the flow of current though the electrode 116 from the power supply 106 to the workpiece 120 has less resistance or less impedance which reduces the amount of energy used during the welding process. Similarly in the second embodiment where the diffuser 240 and the contact tip 232 are constructed of a conductive material and are securely held in constant contact by the diffuser sleeve 220 constructed of a poorly conductive or non-conductive material or less conductive material, the flow of current though the electrode 116 from the power supply 106 to the workpiece 120 has less resistance or less impedance which reduces the amount of energy used during the welding process. Constructing the insert 40, the diffuser 240 or the insert 340 from a conductive material provides better conductivity throughout the end assembly 10, 210 or 310 allowing for a consistence flow of current through the end assembly 10, 210 or 310 which reduces impedance during the welding and allows for consistent arc starting and results in less false arc starts. Reducing false arc starts and ensuring good, clean arc starting results in more efficient welding and less energy usage during welding. Constructing the insert 40 or 340, the diffuser 240 from a conductive material also provides less resistance or less impedance to the current flow which allows for higher current flow through the end assembly 10, 210 or 310 before overheating of the end assembly 10, 210 or 310 which acts to reduce damage to the end assembly 10, 210 or 310 during high welding.

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. A welding apparatus comprising:
   a contact tip configured to be received in an inner cavity of an end assembly of a welding system, the contact tip defining a bore extending therethrough from a first end to a second end and configured for guiding a weld wire into the first end and out of the second end during a welding operation, wherein the first end has a radiused, convex, bulbous, and curved outer surface;

wherein the first end of the contact tip is configured for being received into an indentation, the indentation having a radiused, concave, and curved inner surface corresponding in shape to the radiused, convex, bulbous, and curved outer surface of the contact tip, wherein the radiused, convex, bulbous, and curved outer surface of the contact tip is configured to abut the radiused, concave, and curved inner surface of the indentation;

wherein the contact tip is a single piece and includes a plurality of external threads extending radially outward therefrom;

wherein the contact tip includes a non-threaded end portion extending axially away from the external threads of the contact tip, wherein the non-threaded end portion includes the radiused, convex, bulbous, and curved outer surface.

2. The welding apparatus of claim 1, further comprising:
a diffusor defining the inner cavity, wherein the contact tip is received in the inner cavity;
wherein the diffuser includes a plurality of internal threads;
wherein the external threads of the contact tip directly contact and threadingly engage the internal threads of the diffuser sleeve.

3. The welding apparatus of claim 2, wherein the indentation is disposed in the inner cavity of the diffusor.

4. The welding apparatus of claim 3, wherein threaded engagement of the contact tip with the diffuser sleeve compresses the radiused, convex, bulbous, and curved outer surface of the contact tip into abutting relationship with the radiused, concave, and curved inner surface of the indentation in response to rotation of the external threads relative to the internal threads.

5. The welding apparatus of claim 4 wherein the radiused, convex, bulbous, and curved outer surface of the contact tip matches the curved inner surface of the indentation.

6. The welding apparatus of claim 4 wherein the radiused, convex, bulbous, and curved outer surface of the contact tip fully contacts the curved inner surface of the indentation.

7. The welding apparatus of claim 2, wherein the external threads of the contact tip and the internal threads of the diffuser sleeve are buttress threads.

8. The welding apparatus of claim 2 further comprising:
a gooseneck having a passageway extending to an outlet end of the gooseneck, wherein the diffusor extends axially outward relative the gooseneck;
a nozzle disposed radially outward relative to the diffusor and the contact tip, the nozzle extending axially outward relative to the outlet end of the gooseneck.

9. The welding apparatus of claim 8, wherein the nozzle axially overlaps the outlet end of the gooseneck.

10. The welding apparatus of claim 8, wherein the diffusor is in threaded engagement with the gooseneck to define a gooseneck and diffusor assembly.

11. The welding apparatus of claim 10, wherein the nozzle is threadingly connected to the gooseneck and diffusor assembly.

12. The welding apparatus of claim 8 further comprising an insulator disposed radially between at least a portion of the diffusor and the nozzle.

13. A welding apparatus comprising:
a contact tip configured for being installed in an inner cavity of a diffuser sleeve so that the contact tip extends into the inner cavity of the diffuser sleeve and extends outward from the diffuser sleeve when installed in the diffuser sleeve, the contact tip having a first end with a convex and curved outer mating surface wherein the first end of the contact tip extends into an indentation when installed in the diffuser sleeve, wherein the contact tip is a single piece and includes a plurality of external threads extending radially outward therefrom;

wherein the first end of the contact tip having the outer mating surface defines an opening having a perimeter, wherein the perimeter of the opening defines a terminal end of the convex and curved outer mating surface of the contact tip, wherein the outer mating surface intersects the perimeter of the opening along a curved path.

14. The welding apparatus of claim 13 further comprising a diffuser sleeve having an inner cavity, the indentation disposed within the diffuser sleeve, the indentation having a concave and curved inner surface corresponding in shape to the outer mating surface of the contact tip.

15. The welding apparatus of claim 14, wherein the diffuser sleeve includes a plurality of internal threads, wherein the external threads of the contact tip directly contact and threadingly engage the internal threads of the diffuser sleeve and compress the convex and curved outer mating surface of the contact tip into abutting relationship with the concave and curved inner surface of the indentation in response to rotation of the external threads relative to the internal threads.

16. A welding apparatus comprising:
a contact tip having a first end with a convex and curved end portion wherein the first end of the contact tip is configured to abut a corresponding concave and curved surface of an indentation of an end assembly of a welding system, the contact tip having a second end configured for a weld wire to exit during a welding operation;
a central bore extending longitudinally through the contact tip between the first end and the second end and defining a central longitudinal axis;
wherein the contact tip is a single piece and includes a plurality of external threads extending radially outward therefrom;
wherein the convex and curved end portion defines a curved path through a cross-sectional plane that is parallel to the longitudinal axis and includes the longitudinal axis.

17. The welding apparatus of claim 16 further comprising a diffuser sleeve extending longitudinally between a first and second end thereof, the diffuser sleeve including a plurality of internal threads, wherein the external threads of the contact tip directly contact and threadingly engage the internal threads of the diffuser sleeve.

18. The welding apparatus of claim 17, wherein the indentation is disposed within the diffuser sleeve, wherein threaded engagement between the contact tip and the diffuser sleeve compresses the convex and curved end portion of the contact tip into abutting relationship with the concave and curved inner surface of the indentation in response to rotation of the external threads relative to the internal threads.

19. The welding apparatus of claim 18 wherein the convex and curved end portion of the contact tip matches the curved inner surface of the indentation.

20. The welding apparatus of claim 18 wherein the curved end portion of the contact tip fully contacts the curved inner surface of the indentation.

21. The welding apparatus of claim 17, wherein the external threads of the contact tip and the internal threads of the diffuser sleeve are buttress threads.

22. The welding apparatus of claim 16, wherein the external threads are closer to the first end of the contact tip than the second end of the contact tip.

23. The welding apparatus of claim 16, wherein the contact tip includes a first non-threaded portion extending axially away from the external threads of the contact tip in a first direction, wherein the first non-threaded end portion includes the convex and curved end portion, and wherein the contact tip includes a second non-threaded portion extending axially away from the external threads of the contract tip in a second direction opposite the first direction.

24. The welding apparatus of claim 16, wherein the convex and curved end portion includes a radiused, bulbous, convex, and curved outer surface.

25. The welding apparatus of claim 16, wherein a radius of the end portion varies along the curved path of the convex and curved end surface.

26. An end assembly for a welding device comprising
a gooseneck having a passageway;
a diffuser sleeve having a first end and a second end with a longitudinal axis extending therebetween, having an inner cavity and having a wall having a hole, the diffuser sleeve connected to the gooseneck,
a contact tip positioned in the inner cavity of the diffuser sleeve so that the contact tip extends into the inner cavity of the diffuser sleeve and extends outward from the diffuser sleeve, the contact tip having a first end with a radiused, convex, bulbous, and curved outer surface wherein the first end of the contact tip extends into an indentation, the indentation having a radiused, concave, and curved inner surface corresponding in shape to the radiused, convex, bulbous, and curved outer surface of the contact tip, wherein the radiused, convex, bulbous, and curved outer surface of the contact tip abuts the radiused, concave, and curved inner surface of the indentation;
a nozzle having a gas channel and extending outward relative to the gooseneck in a direction opposite the gooseneck;
wherein the contact tip is a single piece and includes a plurality of external threads extending radially outward therefrom;
wherein the diffuser sleeve includes a plurality of internal threads;
wherein the external threads of the contact tip directly contact and threadingly engage the internal threads of the diffuser sleeve and compress the radiused, convex, bulbous, and curved outer surface of the contact tip into abutting relationship with the radiused, concave, and curved inner surface of the indentation in response to rotation of the external threads relative to the internal threads;
wherein the contact tip includes a non-threaded end portion extending axially away from the external threads of the contact tip, wherein the non-threaded end portion includes the radiused, convex, bulbous, and curved outer surface.

27. The end assembly of claim 26 wherein the curved outer surface of the contact tip matches the curved inner surface of the indentation.

28. The end assembly of claim 26 wherein the curved outer surface of the contact tip fully contacts the curved inner surface of the indentation.

29. The end assembly of claim 26, wherein the radiused, convex, bulbous, and curved outer surface defines a curved path through a cross-sectional plane that is parallel to the longitudinal axis and includes the longitudinal axis.

30. The end assembly of claim 26, wherein the first end of the contact tip defines an opening having a perimeter, wherein the perimeter of the opening defines a terminal end of the radiused, convex, bulbous, and curved outer surface of the contact tip, wherein the radiused, convex, bulbous, and curved outer surface intersects the perimeter of the opening along a curved path.

\* \* \* \* \*